(12) United States Patent
Nakamura et al.

(10) Patent No.: US 11,085,168 B2
(45) Date of Patent: Aug. 10, 2021

(54) WORK MACHINE

(71) Applicant: HITACHI CONSTRUCTION MACHINERY CO., LTD., Tokyo (JP)

(72) Inventors: Satoshi Nakamura, Hitachinaka (JP); Kunitsugu Tomita, Kashiwa (JP); Kazunori Hoshino, Tsukuba (JP); Yousuke Yamanobe, Ushiku (JP); Youhei Toriyama, Kashiwa (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 161 days.

(21) Appl. No.: 16/490,998

(22) PCT Filed: Apr. 27, 2018

(86) PCT No.: PCT/JP2018/017320
§ 371 (c)(1),
(2) Date: Sep. 4, 2019

(87) PCT Pub. No.: WO2019/064666
PCT Pub. Date: Apr. 4, 2019

(65) Prior Publication Data
US 2020/0018037 A1 Jan. 16, 2020

(30) Foreign Application Priority Data
Sep. 26, 2017 (JP) .............................. JP2017-185481

(51) Int. Cl.
*E02F 3/43* (2006.01)
*E02F 9/20* (2006.01)
(Continued)

(52) U.S. Cl.
CPC .............. *E02F 3/43* (2013.01); *E02F 9/2029* (2013.01); *E02F 9/2033* (2013.01); *E02F 9/26* (2013.01); *G01G 19/18* (2013.01)

(58) Field of Classification Search
CPC ......... E02F 3/43; E02F 9/2029; E02F 9/2033; E02F 9/2062; E02F 9/2253; E02F 9/26; G01G 19/083; G01G 19/18
See application file for complete search history.

(56) References Cited

U.S. PATENT DOCUMENTS 9,309,650 B2 * 4/2016 Nagato ................ G07C 5/0808
9,400,003 B2 7/2016 Kim et al.
(Continued)

FOREIGN PATENT DOCUMENTS

CN 103900669 A 7/2014
CN 106256966 A 12/2016
(Continued)

OTHER PUBLICATIONS

International Search Report of PCT/JP2018/017320 dated May 29, 2018.
(Continued)

*Primary Examiner* — Tyler J Lee
(74) *Attorney, Agent, or Firm* — Mattingly & Malur, PC

(57) ABSTRACT

A hydraulic excavator (1) including a controller (21) having a load computing section (52) configured to compute a load of a work target material on the basis of thrust information about a boom cylinder (16) during the period when a front work implement (12) is performing a transporting operation of a work target material, the controller (21) further including: a velocity limiting value computing section (55) configured to compute a limiting value (Vlim) of a velocity of a boom cylinder (16) on the basis of posture information about the work implement (12) at a time of starting the transporting operation; a velocity command correction section (50) configured to correct a velocity command in such a manner that the velocity of the boom cylinder is equal to the limiting value (Vlim) when the velocity of the boom cylinder exceeds the limiting value and output the corrected
(Continued)

velocity command; and a drive signal generation section (51) configured to generate and output a drive signal for the boom cylinder on the basis of the velocity command output from a velocity command correction section.

7 Claims, 25 Drawing Sheets

(51) Int. Cl.
    *E02F 9/26*     (2006.01)
    *G01G 19/18*     (2006.01)

(56) References Cited

U.S. PATENT DOCUMENTS

| | | | |
|---|---|---|---|
| 10,343,578 B2* | 7/2019 | Osagawa | F15B 15/22 |
| 2009/0228177 A1* | 9/2009 | Mintah | E02F 3/435 |
| | | | 701/50 |
| 2009/0228394 A1 | 9/2009 | Mintah et al. | |
| 2013/0239560 A1 | 9/2013 | Kim et al. | |
| 2014/0261152 A1* | 9/2014 | Tanaka | E02F 9/265 |
| | | | 116/230 |
| 2015/0240458 A1* | 8/2015 | Nagato | G07C 5/10 |
| | | | 701/32.7 |
| 2015/0292178 A1* | 10/2015 | Nagato | E02F 9/2296 |
| | | | 701/50 |
| 2015/0376868 A1* | 12/2015 | Jackson | E02F 9/2029 |
| | | | 701/50 |
| 2016/0040398 A1 | 2/2016 | Kitajima et al. | |
| 2016/0369480 A1 | 12/2016 | Mizuochi et al. | |
| 2018/0120098 A1* | 5/2018 | Matsuo | E02F 9/264 |
| 2018/0148905 A1 | 5/2018 | Matsuyama et al. | |
| 2020/0299929 A1* | 9/2020 | Ohiwa | E02F 9/265 |

FOREIGN PATENT DOCUMENTS

| | | |
|---|---|---|
| CN | 107109819 A | 8/2017 |
| JP | 2003-118975 A | 4/2003 |
| JP | 2006-290561 A | 10/2006 |
| JP | 2009-236752 A | 10/2009 |
| JP | 2010-037036 A | 2/2010 |
| JP | 2010-076911 A | 4/2010 |
| JP | 2011-157163 A | 8/2011 |
| JP | 2012-111581 A | 6/2012 |
| JP | 5406223 B2 | 2/2014 |
| JP | 2017-133330 | 8/2017 |
| WO | 2015/137528 A1 | 4/2017 |
| WO | 2017/104408 A1 | 6/2017 |

OTHER PUBLICATIONS

International Preliminary Report on Patentability received in corresponding International Application No. PCT/JP2018/017320 dated Apr. 9, 2020.

Chinese Office Action received in corresponding Chinese Application No. 201880014384.9 dated Jan. 19, 2021.

Korean Office Action received in corresponding Korean Application No. 10-2019-7025122 dated Feb. 22, 2021.

* cited by examiner

WORK MACHINE

TECHNICAL FIELD

The present invention relates to a work machine configured with a controller that computes a load value of a work target material transported to above a transporting machine by a work implement.

BACKGROUND ART

In general, a work machine typified by a hydraulic excavator often performs work (loading work) for loading an excavated material (often referred to as "work target material" in the present description) onto the transporting machine, as exemplified by the excavation of minerals and loading of the minerals onto a dump truck in a mine.

If a loading amount onto the transporting machine (gross weight of the work target material on the transporting machine) can be set to a proper amount at the time of such work, it is possible to eliminate declining production caused by short loading and to eliminate waste of reloading caused by overloading, thereby improving on-site production efficiency.

As means for setting the loading amount onto the transporting machine to the proper amount, there is known a method of measuring a load of an excavated material (work target material) during transport of the excavated material by a loading machine and presenting the measured load to an operator of a work machine. Presenting the load of the excavated material enables the operator of the work machine to grasp the loading amount onto the transporting machine, to adjust next and the following excavation amounts, and to set the loading amount onto the transporting machine to the proper amount.

In relation to a device that measures the load of the excavated material transported by the work machine, a technique for measuring the load during transporting work is known. As a device for measuring the load of the work target material, Japanese Patent No. 5406223 (Patent Document 1) discloses a payload monitoring system that divides a work cycle of a work machine into a plurality of segments including a transported state segment (loaded moving segment) that is a segment during which an excavated material is put into a work tool and transported, determines a time period within the transported state segment of the work cycle during which a velocity of the work tool (tool) is substantially constant, measures the load of the excavated material (payload of the tool) on the basis of a lifting force of the work tool (tool) recorded during the time period, and displays the measured load.

PRIOR ART DOCUMENT

Patent Document

Patent Document 1: Japanese Patent No. 5406223

SUMMARY OF THE INVENTION

Problems to be Solved by the Invention

In the system of Patent Document 1, the load of the excavated material is computed a plurality of times during the time period during which the velocity of the work tool is substantially constant and during which the accuracy of measuring the load of the excavated material is, in general, considered to be high in ordinary transporting work. Furthermore, to ensure accuracy in the measurement of the load of the excavated material, it is preferable to sufficiently ensure the number of times of computing the load of the excavated material (number of times of sampling) during the time period during which the velocity of the work tool is substantially constant. In other words, from the viewpoint of ensuring the number of times of computing the load of the excavated material and maintaining measurement accuracy, it is preferable to provide the time period during which the velocity of the work tool is substantially constant for a length necessary to ensure the accuracy. However, there is a concern that the time period during which the velocity of the work tool is substantially constant cannot be sufficiently ensured and a work cycle in which sufficient measurement accuracy cannot be obtained occurs, depending on a work environment or an operator's operational skill.

An object of the present invention is to provide a work machine that can accurately measure a load of a work target material without relying on a work environment or an operator's operational skill.

Means for Solving the Problems

While the present application includes a plurality of means for solving the problems, an example of the plurality of means is as follows. A work machine according to the present invention is a work machine including: a multijoint work implement; an actuator configured to drive the work implement; an operation device configured to generate a velocity command to the actuator in response to an operation amount; and a controller having a load computing section configured to compute a load of a work target material on the basis of thrust information about the actuator while the work implement is transporting the work target material to above a transporting machine, the controller further including: a velocity limiting value computing section that computes a limiting value of a velocity of the actuator on the basis of posture information about the work implement at a time of starting transport of the work target material to above the transporting machine by the work implement; a velocity command correction section configured to correct the velocity command in such a manner that the velocity of the actuator is equal to the limiting value when the velocity of the actuator specified by the velocity command exceeds the limiting value and output the corrected velocity command, and configured to output the velocity command without correction when the velocity of the actuator specified by the velocity command is equal to or lower than the limiting value; and a drive signal generation section configured to generate and outputs a drive signal for the actuator on the basis of the velocity command output from the velocity command correction section.

Advantages of the Invention

According to the present invention, an operating velocity of a work implement is limited on the basis of a posture of the work implement at the time of starting transport, and the time period during which the velocity of a work tool is substantially constant can be ensured for a necessary length for maintaining measurement accuracy; thus, it is possible to accurately measure the load of the work target material without relying on a work environment or an operator's operational skill.

MODES FOR CARRYING OUT THE INVENTION

Embodiments of the present invention will be described hereinafter with reference to the drawings. A case in which a hydraulic excavator is used as a loading machine that configures a load measurement system of a work machine and a dump truck is used as a transporting machine will be described hereinafter.

Types of the work machine (loading machine) for the present invention are not limited to a hydraulic excavator having a bucket as an attachment but also include hydraulic excavators having attachments such as a grapple or a lifting magnet capable of holding and releasing a transported material. Furthermore, the present invention is also applicable to a wheel loader that is equipped with a working arm and that does not have a swing function like that of a hydraulic excavator.

Embodiment 1

Overall Configuration

Figure 1:
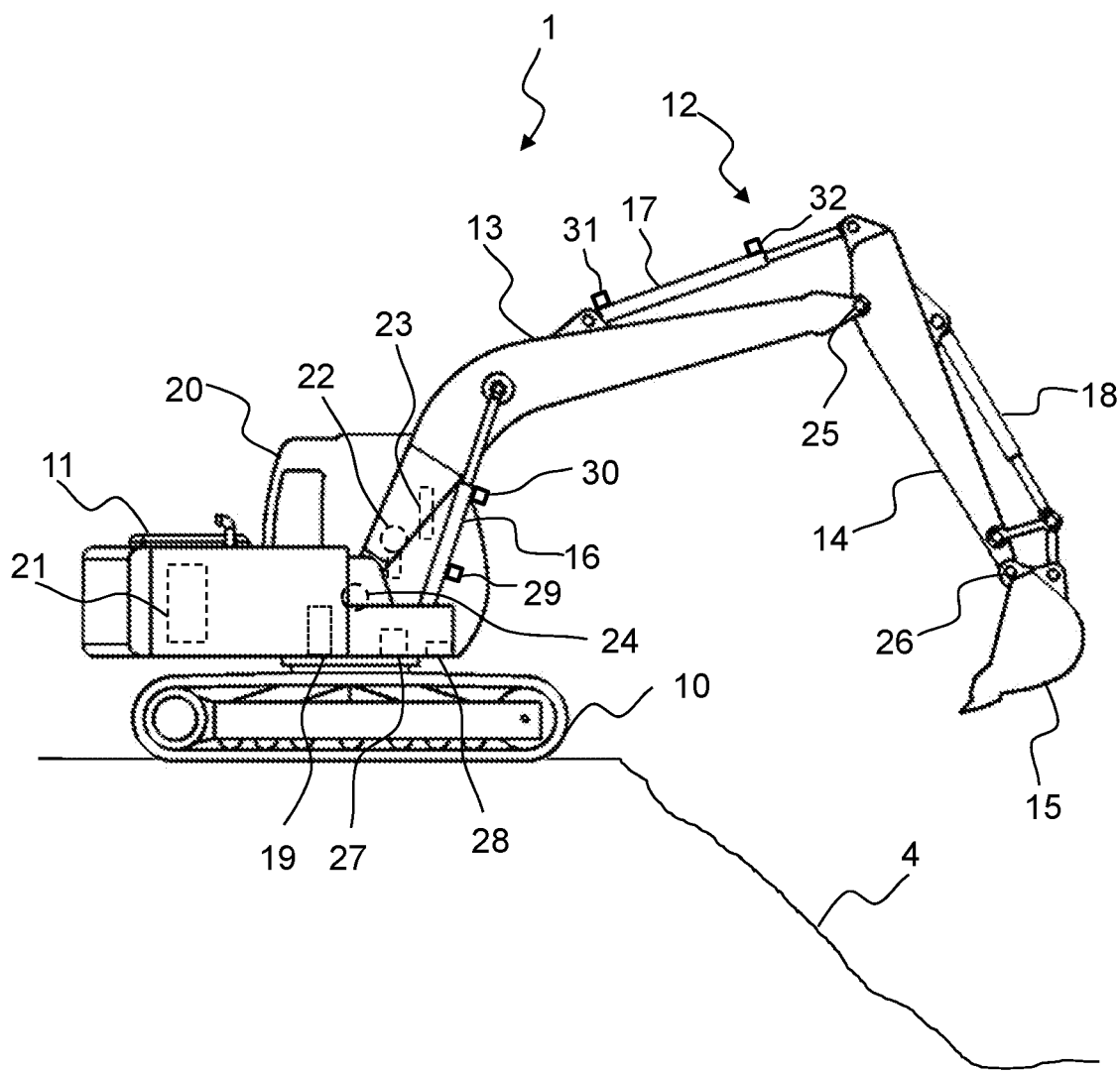
FIG. 1 is a side view of a hydraulic excavator according to the embodiments of the present invention.

FIG. 1 is a side view of a hydraulic excavator according to the present embodiment. A hydraulic excavator 1 of FIG. 1 is configured with a lower travel structure 10, an upper swing structure 11 swingably provided in an upper portion of the lower travel structure 10, a front work implement 12 that is a multijoint working arm mounted forward of the upper swing structure 11, a swing motor 19 that is a hydraulic motor for rotating the upper swing structure 11, an operation room (cabin) 20 that is provided on the upper swing structure 11 for an operator (operating person) to get in and operate the excavator 1, operation levers (operation devices) 22 (22a, 22b) that are provided in the operation room 20 to control the operations of actuators mounted in the hydraulic excavator 1, storage devices (for example, a ROM and a RAM), a computing processing device (for example, CPU), and a controller 21 that has input/output devices and that controls operations of the hydraulic excavator 1.

The front work implement 12 is configured with a boom 13 rotatably provided on the upper swing structure 11, an arm 14 rotatably provided on a tip end of the boom 13, a bucket (attachment) 15 rotatably provided on a tip end of the arm 14, a boom cylinder 16 that is a hydraulic cylinder which drives the boom 13, an arm cylinder 17 that is a hydraulic cylinder which drives the arm 14, and a bucket cylinder 18 that is a hydraulic cylinder which drives the bucket 15.

A boom angle sensor 24, an arm angle sensor 25, and a bucket angle sensor 26 are attached to the rotating shafts of the boom 13, the arm 14, and the bucket 15, respectively. Rotation angles of the boom 13, the arm 14, and the bucket 15 can be acquired from these angle sensors 24, 25, and 26. Furthermore, a swing angular velocity sensor (for example, gyroscope) 27 and an inclination angle sensor 28 are attached to the upper swing structure 11, and are configured to be capable of acquiring a swing angular velocity of the upper swing structure 11 and a longitudinal inclination angle of the upper swing structure 11, respectively. A posture of the front work implement 12 can be identified from detection values of the angle sensors 24, 25, 26, 27, and 28.

A boom bottom pressure sensor 29 and a boom rod pressure sensor 30 are attached to the boom cylinder 16, an arm bottom pressure sensor 31 and an arm rod pressure sensor 32 are attached to the arm cylinder 17, and the pressure sensors 29, 30, 31, and 32 are configured to be capable of acquiring internal pressures of the hydraulic cylinders. Thrusts of the cylinders 16 and 18, that is, driving forces applied to the front work implement 12 can be identified from detection values of the pressure sensors 29, 30, 31, and 32.

It is noted that the boom angle sensor 24, the arm angle sensor 25, the bucket angle sensor 26, the inclination angle sensor 28, and the swing angular velocity sensor 27 can be replaced by other sensors as long as the other sensors can detect physical quantities related to the posture of the front work implement 12. For example, the boom angle sensor 24, the arm angle sensor 25, and the bucket angle sensor 26 can be replaced by inclination angle sensors or inertial measurement units (IMUs), respectively. Furthermore, the boom bottom pressure sensor 29, the boom rod pressure sensor 30, the arm bottom pressure sensor 31, and the arm rod pressure sensor 32 can be replaced by other sensors as long as the other sensors can detect physical quantities related to the thrusts generated by the boom cylinder 16 and the arm cylinder 17, that is, the driving forces applied to the front work implement 12. Moreover, operations of the front work implement 12 may be detected by detecting operating velocities of the boom cylinder 16 and the arm cylinder 17 by stroke sensors or by detecting operating velocities of the boom 13 and the arm 14 by the IMUs as an alternative to detection of the thrusts or driving forces.

A monitor (display device) 23 displaying computing results of the controller 21 (for example, a load value of a work target material 4 within the bucket 15 computed by a load computing section 52) is provided within the operation room 20, and a wireless transmitter-receiver (not depicted) used for the controller 21 to communicate with an external computer or the like is attached to an upper surface of the upper swing structure 11.

The monitor 23 in the present embodiment has a touch panel and also functions as an input device used by an operator to input information to the controller 21. As the monitor 23, for example, a liquid crystal display having a touch panel can be used.

The operation lever 22a indicates raising and lowering of the boom 13 (expansion and contraction of the boom cylinder 16) and dumping and crowding of the bucket 15 (expansion and contraction of the bucket cylinder 18), while the operation lever 22b indicates dumping and crowding of the arm 14 (expansion and contraction of the arm cylinder 17) and left swing and right swing of the upper swing structure 11 (left rotation and right rotation of the hydraulic motor 19). The operation levers 22a and 22b are double-compound multifunction operation levers. Operating the operation lever 22a forward and backward corresponds to the raising and lowering of the boom 13, operating the operation lever 22a leftward and rightward corresponds to the crowding and dumping of the bucket 15, operating the operation lever 22b forward and backward corresponds to the dumping and crowding of the arm 14, and operating the operation lever 22b leftward and rightward corresponds to the left rotation and right rotation of the upper swing structure 11, respectively. When any of the levers is operated in an oblique direction, two corresponding actuators operate simultaneously. Furthermore, operation amounts of the operation levers 22a and 22b specify the operating velocities of the actuators 16 to 19.

Figure 2:
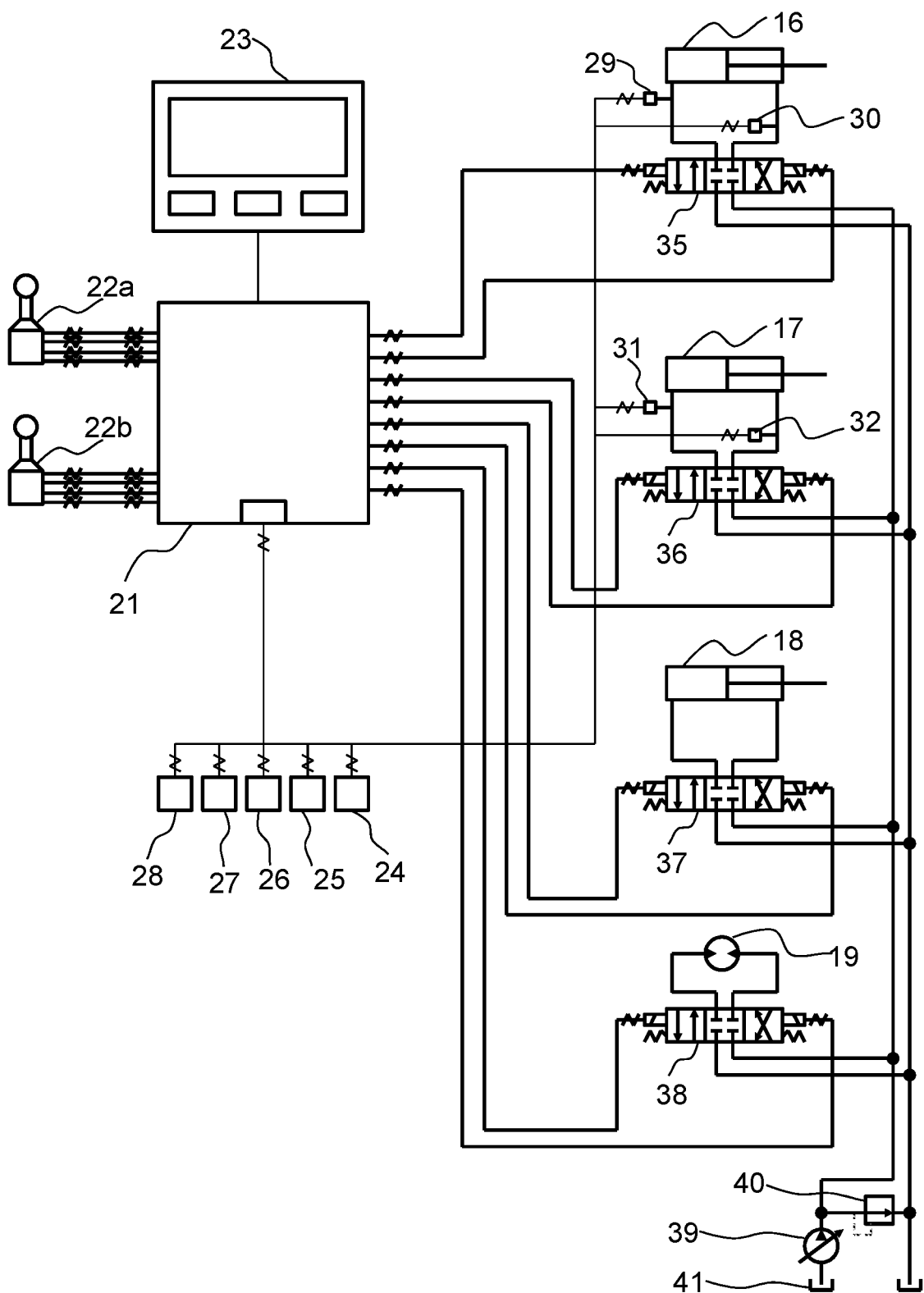
FIG. 2 is a schematic diagram of a hydraulic circuit of the hydraulic excavator according to the embodiments of the present invention.

FIG. 2 is a schematic diagram of a hydraulic circuit of the hydraulic excavator 1 according to the present embodiment. The boom cylinder 16, the arm cylinder 17, the bucket cylinder 18, and the swing motor 19 are driven by a hydraulic operating fluid delivered from a main pump 39. Flow rates and circulation directions of the hydraulic operating fluid supplied to the hydraulic actuators 16 to 19 are controlled by control valves 35, 36, 37, and 38 operating by drive signals output from the controller 21 in response to the operation directions and operation amounts of the operation levers 22a and 22b.

The operation levers 22a and 22b generate operation signals in response to the operation directions and the operation amounts, and output the operation signals to the controller 21. The controller 21 generates the drive signals (electrical signals) corresponding to the operation signals and outputs the drive signals to the control valves 35 to 38 that are solenoid valves, thereby allowing the control valves 35 to 38 to operate.

The operation directions of the operation levers 22a and 22b specify the operating directions of the hydraulic actuators 16 to 19. A spool of the control valve 35 that controls the boom cylinder 16 moves leftward in FIG. 2 to supply the hydraulic operating fluid to a bottom side of the boom cylinder 16 when the operation lever 22a is operated backward, and moves rightward in FIG. 2 to supply the hydraulic operating fluid to a rod side of the boom cylinder 16 when the operation lever 22a is operated forward. A spool of the control valve 36 that controls the arm cylinder 17 moves leftward in FIG. 2 to supply the hydraulic operating fluid to a bottom side of the arm cylinder 17 when the operation lever 22b is operated backward, and moves rightward in FIG. 2 to supply the hydraulic operating fluid to a rod side of the arm cylinder 17 when the operation lever 22b is operated forward. A spool of the control valve 37 that controls the bucket cylinder 18 moves leftward in FIG. 2 to supply the hydraulic operating fluid to a bottom side of the bucket cylinder 18 when the operation lever 22a is operated rightward, and moves rightward in FIG. 2 to supply the hydraulic operating fluid to a rod side of the bucket cylinder 18 when the operation lever 22a is operated leftward. A spool of the control valve 38 that controls the swing motor 19 moves leftward in FIG. 2 to supply the hydraulic operating fluid to the swing motor 19 from leftward when the operation lever 22b is operated rightward, and moves rightward in FIG. 2 to supply the hydraulic operating fluid to the swing motor 19 from rightward when the operation lever 22b is operated leftward.

Furthermore, the valve opening degrees of the control valves 35 to 38 change depending on the operation amounts of the corresponding operation lever 22a or 22b. In other words, the operation amounts of the operation levers 22a and 22b specify the operating velocities of the hydraulic actuators 16 to 19. For example, when the operation amounts of the operation levers 22a and 22b in a certain direction increase, then the valve opening degrees of the control valves 35 to 38 corresponding to the direction increase, the flow rates of the hydraulic operating fluid supplied to the hydraulic actuators 16 to 19 increase, and the velocities of the hydraulic actuators 16 to 19 thereby increase. In this way, the operation signals generated by the operation levers 22a and 22b have an aspect of velocity commands to the target hydraulic actuators 16 to 19. Therefore, in the present description, the operation signals generated by the operation levers 22a and 22b are often referred to as "velocity commands" to the hydraulic actuators 16 to 19 (control valves 35 to 38).

A pressure (hydraulic pressure) of the hydraulic operating fluid delivered from the main pump 39 is adjusted in such a manner that the pressure does not become excessive by a relief valve 40 in communication with a hydraulic operating fluid tank 41 by a relief pressure. Return lines of the control valves 35 to 38 are in communication with the hydraulic operating fluid tank 41 in such a manner that the hydraulic fluid supplied to the hydraulic actuators 16 to 19 returns again to the hydraulic operating fluid tank 41 via the control valves 35 to 38.

The controller 21 is configured such that signals from the boom angle sensor 24, the arm angle sensor 25, the bucket angle sensor 26, the swing angular velocity sensor 27, the inclination angle sensor 28, the boom bottom pressure sensor 29 and boom rod pressure sensor 30 attached to the boom cylinder 16, and the arm bottom pressure sensor 31 and the arm rod pressure sensor 32 attached to the arm cylinder 17 are input to the controller 21, and is configured to compute a load on the basis of these sensor signals and to display a load measurement result on the monitor 23.

System Configuration

Figure 3:
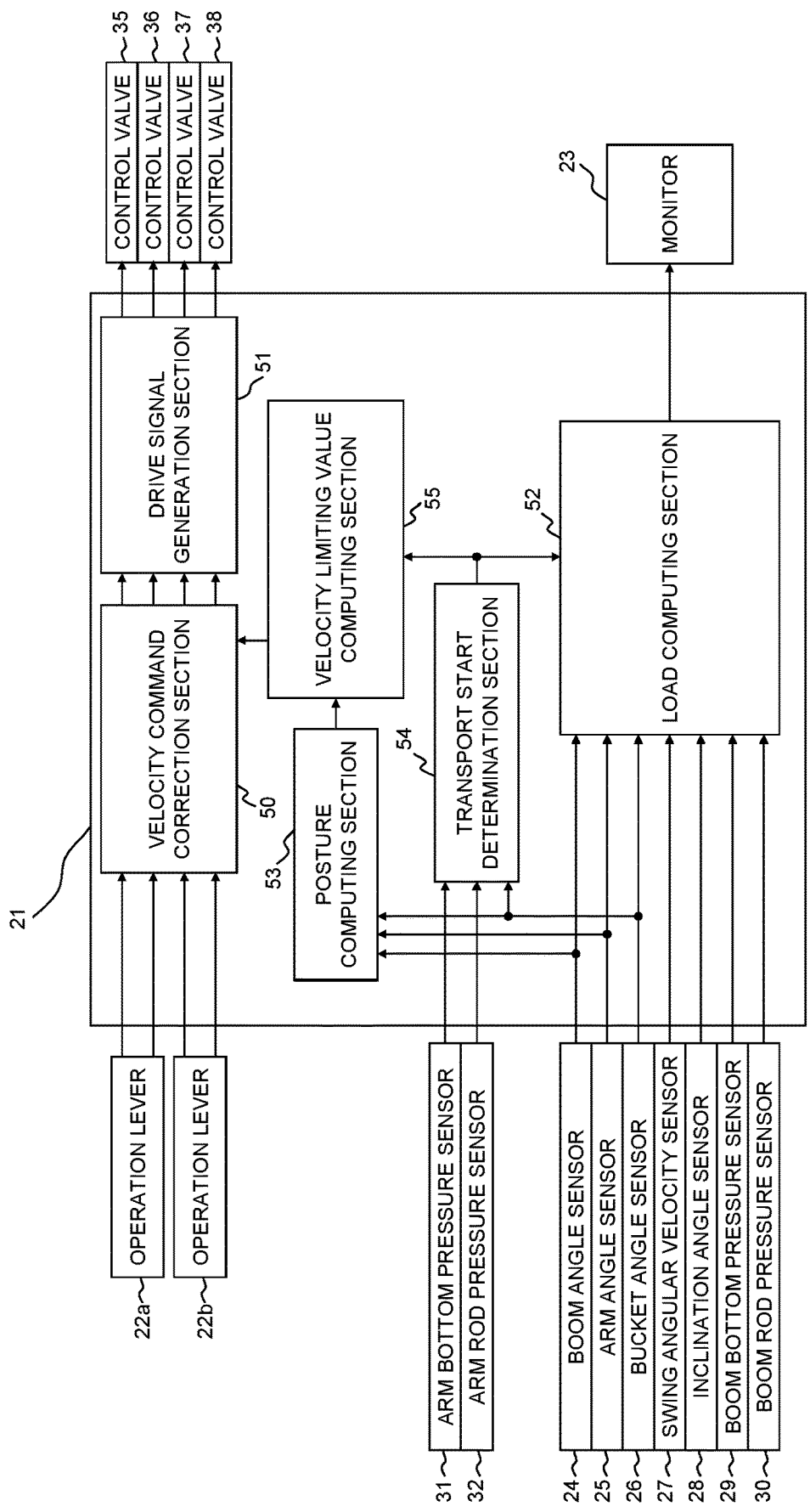
FIG. 3 is a system configuration diagram of a load measurement system according to Embodiment 1.

FIG. 3 is a system configuration diagram of the load measurement system in the present embodiment. The load measurement system in the present embodiment is implemented in the controller 21 as a combination of several types of software, and configured to generate the drive signals on the basis of the velocity commands (operation signals) input from the operation levers 22a and 22b, and to drive the corresponding control valves 35 to 38 by the drive signals. In addition, the load measurement system is configured such that the signals from the sensors 24 to 32 are input to the load measurement system and configured to compute a load value of the work target material within the controller 21 and to display the load value on the monitor 23.

Furthermore, functions of the controller 21 are depicted in a block diagram within the controller 21 of FIG. 3. The controller 21 is configured with a posture computing section 53 that computes posture information about the front work implement 12 on the basis of the detection values of the angle sensors 24 to 28, a transport start determination section 54 that determines time of starting transport of the work target material to above a cargo stand of the dump truck (transporting machine) by the front work implement 12 (that is, the time of starting a transporting operation) on the basis of load information of the arm cylinder 17 (for example, the detection value of the arm bottom pressure sensor 31), the load computing section 52 that computes the load of the work target material on the basis of thrust information about the boom cylinder 16 (for example, the detection values of the bottom pressure sensor 29 and the rod pressure sensor 30 of the boom cylinder 16) operating while the front work implement 12 is transporting the work target material to above the cargo stand of the dump truck (that is, during the transporting operation), a velocity limiting value computing section 55 that computes a limiting value (velocity limiting value) Vlim of the velocity of the boom cylinder 16 on the basis of the posture information about the front work implement 12 at the time of starting transport of the work target material to above the cargo stand of the dump truck by the front work implement 12 (that is, at the time of starting the transporting operation), a velocity command correction section 50 that corrects the velocity command in such a manner that a boom cylinder velocity specified by the velocity command from the operation lever 22 is equal to the limiting value Vlim when the boom cylinder velocity exceeds the limiting value Vlim and outputs the corrected velocity command, and that outputs the velocity command without correction when the boom cylinder velocity specified by the velocity command is equal to or lower than the limiting value Vlim, and a drive signal generation section 51 that generates and outputs the drive signal for the boom cylinder 16 (drive signal for the control valve 35) on the basis of the velocity command output from the velocity command correction section 50.

Next, a method of correcting, by the load measurement system of the work machine that is an example of the embodiments of the present invention, an operation instruction to the front work implement 12 on the basis of a posture of the front work implement 12 at a time of starting a work cycle, and measuring the load will be described with reference to FIGS. 4A to 12.

Figure 4A:
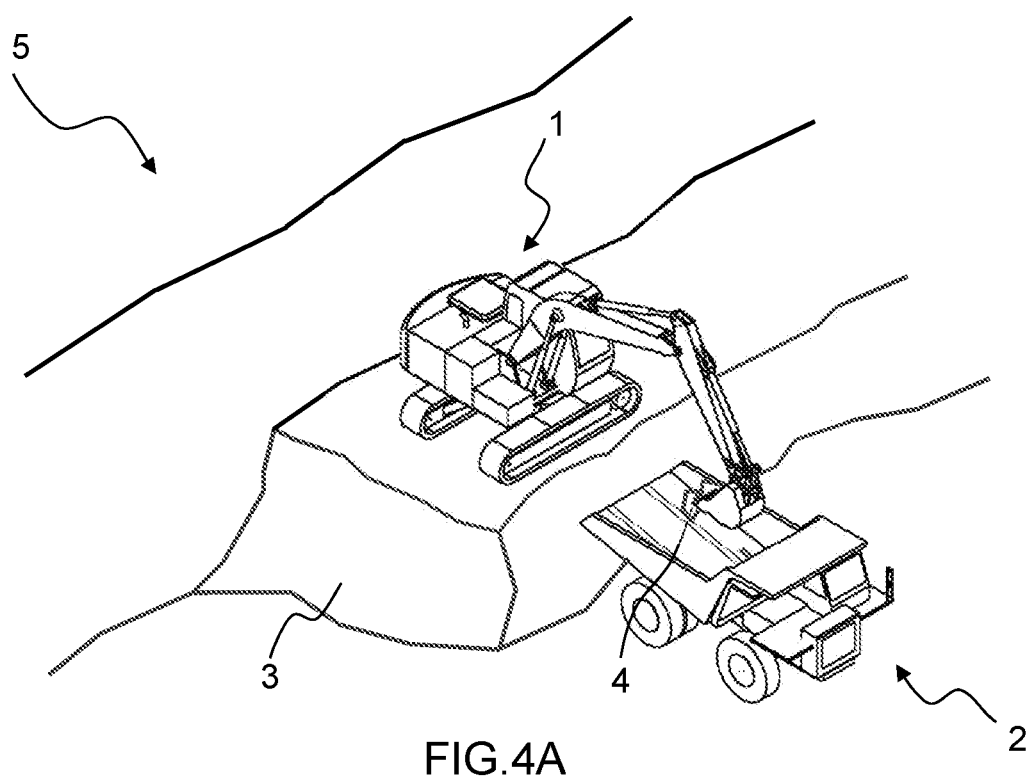
FIG. 4A is a schematic diagram depicting an example of work by the hydraulic excavator.
Figure 4B:
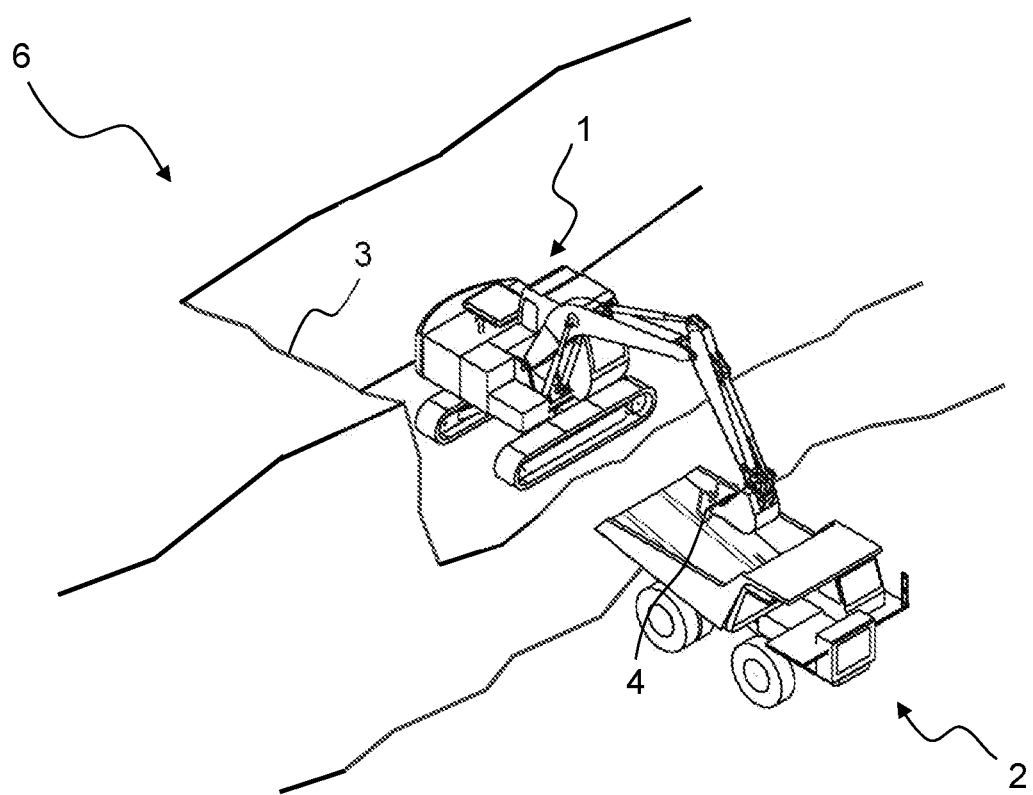
FIG. 4B is a schematic diagram depicting an example of work by the hydraulic excavator.

Definition of Operations of Hydraulic Excavator During Loading Work onto Dump Truck FIGS. 4A and 4B are schematic diagram depicting an example of work by the hydraulic excavator 1. For the sake of convenience, in the present description, the "loading work (transporting work)" by the hydraulic excavator (loading machine) 1 onto the dump truck (transporting machine) 2 is defined as work that includes four operations of: A) a "excavating operation" for excavating a work target material (transported material) 3 and loading the work target material 4 into the bucket 15; B) a "transporting operation" for moving the bucket to above the cargo stand of the dump truck 2 by a combination of swing of the upper swing structure 11 and the operation of the front work implement 12; C) a "loading operation" for releasing (discharging) the work target material 4 within the bucket 15 onto the cargo stand of the dump truck 2; and D) a "reaching operation" for moving the bucket 15 to a desired position on the work target material for starting the excavating operation. In many cases, the hydraulic excavator 1 fills the cargo stand of the dump truck 2 with the work target material 4 to capacity by repeatedly carrying out the four operations in this order. The transporting operation of B) is performed by swing/boom raising in many cases. The loading operation of C) is performed by bucket dumping in many cases.

Excessively loading the work target material 4 onto the cargo stand of the dump truck 2 results in overloading, which entails reduced efficiency and damage to the dump truck 2. Underloading the work target material 4 results in a small transport amount, which entails smaller amount of production. It is, therefore, desirable to set a loading amount of the work target material 4 onto the dump truck 2 to an appropriate amount.

The excavation work by the hydraulic excavator 1 is roughly classified into lower-side work 5 for carrying out work in such a manner that the hydraulic excavator 1 moves backward while excavating a site below the hydraulic excavator 1 (below a bottom surface of the lower travel structure 10) as depicted in FIG. 4A, and upper-side work 6 for carrying out work in such a manner that the hydraulic excavator 1 moves forward while excavating a site above the bottom surface of the lower travel structure 10 and forward of the hydraulic excavator 1 as depicted in FIG. 4B. The work 5 and work 6 differ in the posture of the front work implement 12 at the time of excavation, and differ in the posture of the front work implement 12 at the time of ending the excavation and starting transport. Owing to this, a lifting amount of the bucket 15 at the time of the transporting operation (a deviation of a height of the bucket 15 between the time of starting the transporting operation and the time of ending the transporting operation, that is, a moving amount of the bucket 15 in a height direction during the transporting operation) often varies depending on a work environment.

Determination of Start of Transporting Operation by Transport Start Determination Section 54

Figure 5:
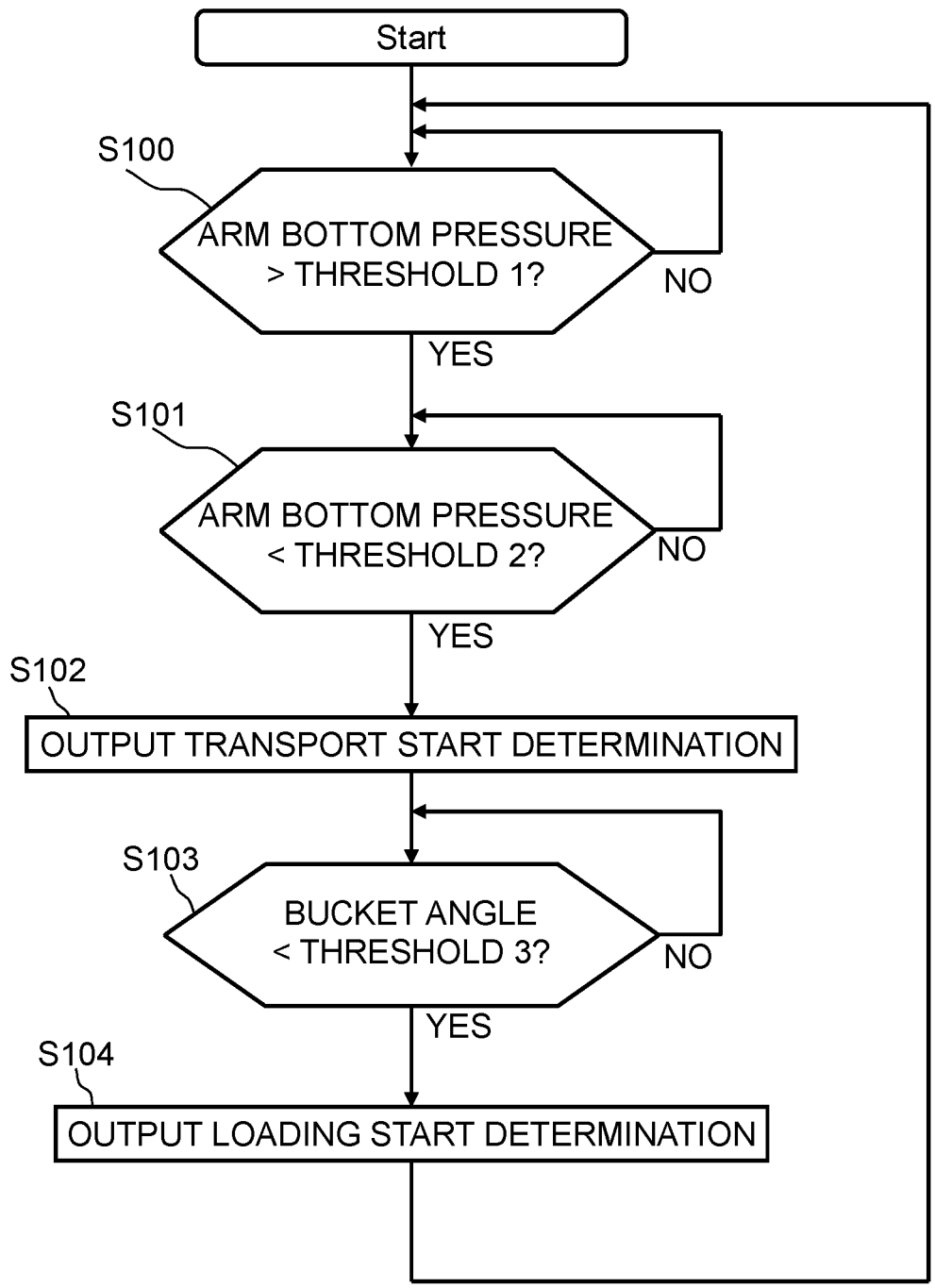
FIG. 5 is a flowchart executed by a transport start determination section in Embodiment 1.
Figure 6:
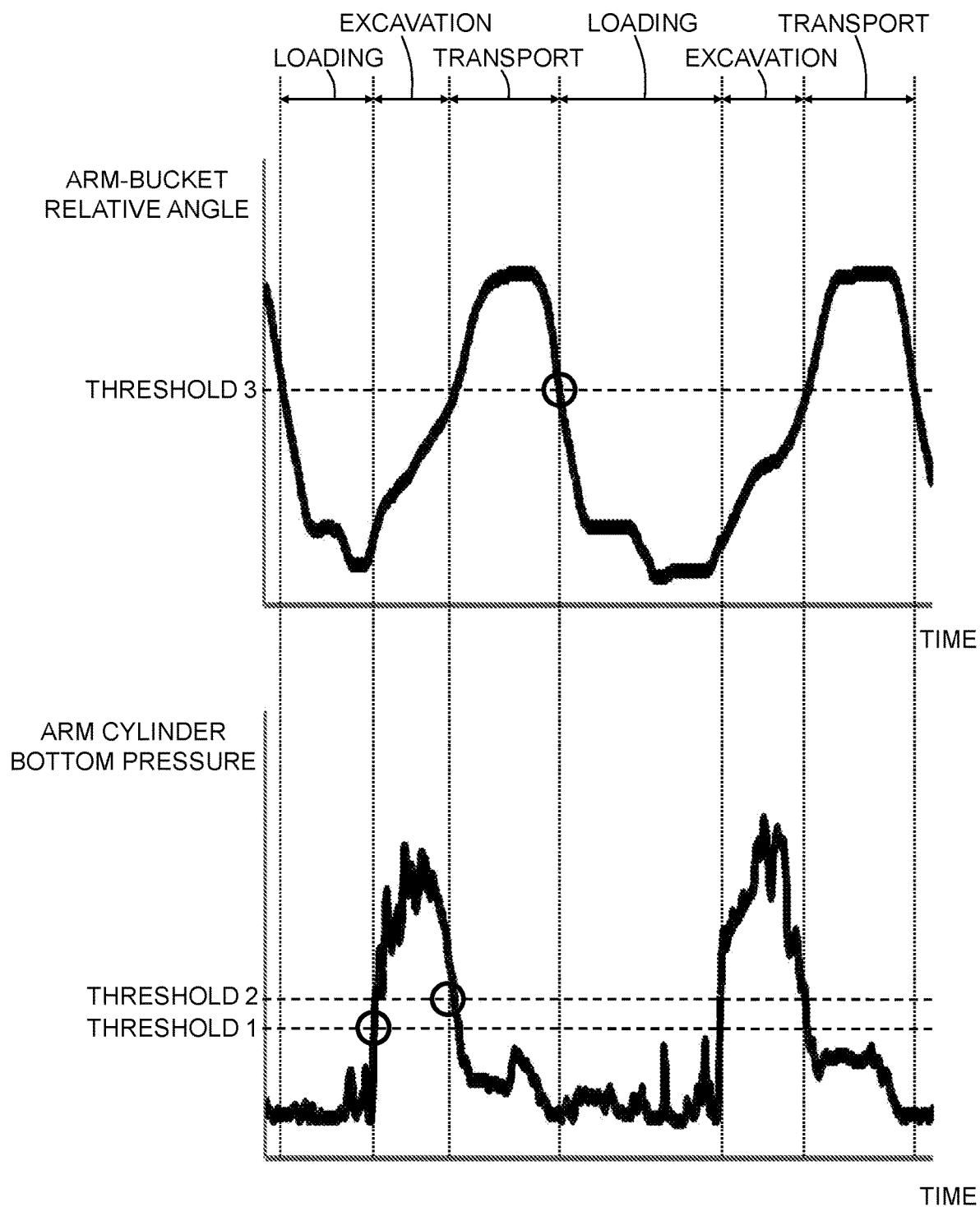
FIG. 6 is an example of graphs depicting a relationship between detection values of an arm bottom pressure sensor and a bucket angle sensor and a determination result by the transport start determination section 54.

FIG. 5 is a flowchart depicting a method, by the transport start determination section 54 in the controller 21, of determining whether the front work implement 12 has started transporting the work target material 4 to above the cargo stand of the dump truck 2, and FIG. 6 is an example of graphs depicting a relationship between detection values of the arm bottom pressure sensor 31 (arm cylinder bottom pressure) and the bucket angle sensor 26 (arm-bucket relative angle) and a determination result by the transport start determination section 54.

The flowchart of FIG. 5 is executed per sampling period preset in the controller 21 of the hydraulic excavator 1.

In Step S100, the transport start determination section 54 monitors an output from the arm bottom pressure sensor 31 and determines whether the arm bottom pressure has exceeded a preset threshold 1 from a state of being lower than the threshold 1. Since the hydraulic excavator 1 performs excavation with the arm cylinder 17 pushed out, the arm cylinder bottom pressure increases during the excavating operation as depicted in the lower graph of FIG. 6; thus, in the present embodiment, the transport start determination section 54 considers that the excavating operation starts at timing at which the arm bottom pressure exceeds the threshold 1. In a case of determining in Step S100 that the arm bottom pressure has exceeded the threshold 1 from the state of being lower than the threshold 1, the transport start determination section 54 determines that the hydraulic excavator 1 has started the excavating operation and goes to Step S101. Conversely, in a case in which the arm bottom pressure does not exceed the threshold 1 from the state of being lower than the threshold 1 (in a case in which the arm bottom pressure is kept equal to or lower than the threshold 1), the transport start determination section 54 returns to before Step S100 and continues to monitor the output from the arm bottom pressure sensor 31.

In Step S101, the transport start determination section 54 continues to monitor the output from the arm bottom pressure sensor 31 and determines whether the arm bottom pressure has become lower than a preset threshold 2 from a state of being higher than the threshold 2. As depicted in the lower graph of FIG. 6, the arm cylinder bottom pressure decreases when the excavating operation is over; thus, in the present embodiment, the transport start determination section 54 considers that the excavating operation is over and the transporting operation starts at timing at which the arm bottom pressure becomes lower than the threshold 2. In a case of determining in Step S101 that the arm bottom pressure has become lower than the threshold 2 from the state of being higher than the threshold 2, the transport start determination section 54 determines that the hydraulic excavator 1 is over with the excavating operation and has started the transporting operation, and goes to Step S102. Conversely, in a case of determining that the arm bottom pressure has not become lower than the threshold 2 (in a case in which the arm bottom pressure is kept equal to or higher than the threshold 2) from the state of being higher than the threshold 2, the transport start determination section 54 determines that the excavating operation is continued, returns to before Step S101, and continues to monitor the output from the arm bottom pressure sensor 31.

In respect to a relationship between the thresholds 1 and 2, the relationship of threshold 1<threshold 2 is satisfied in an example depicted in FIG. 6; however, this is merely an example and arbitrary values can be set in a range in which it is possible to determine start and end of the excavating operation by the hydraulic excavator 1. In addition, at that time, it is assumed that a magnitude relationship between the thresholds 1 and 2 does not matter.

In Step S102, the transport start determination section 54 outputs a determination that the transporting operation has started to an outside and goes to Step S103. A determination output destination at this time includes the velocity limiting value computing section 55 and the load computing section 52.

In Step S103, the transport start determination section 54 monitors an output from the bucket angle sensor 26 and determines whether an arm-bucket relative angle (angle formed between the arm 14 and the bucket 15) has become lower than a preset threshold 3 from an angle greater than the threshold 3. The hydraulic excavator 1, which is over with the transporting operation and starts the loading operation, operates to decrease the angle formed between the arm 14 and the bucket 15 to release the soils (material to be excavated) within the bucket 15. In other words, as depicted in the upper graph of FIG. 6, the relative angle between the arm 14 and the bucket 15 decreases at a time of transition from the transporting operation to the loading operation; thus, in the present embodiment, the transport start determination section 54 considers that the transporting operation is over and the loading operation starts at timing at which the relative angle between the arm 14 and the bucket 15 becomes smaller than the threshold 3. In a case of determining in Step S103 that the arm-bucket relative angle has become smaller than the threshold 3, the transport start determination section 54 determines that the hydraulic excavator 1 is over with the transporting operation and has started the loading operation, and goes to Step S104. Conversely, in a case of determining that the arm-bucket relative angle has not become smaller than the threshold 3 (in a case in which the arm bottom pressure is kept equal to or higher than the threshold 3), the transport start determination section 54 determines that the transporting operation is continued, returns to before Step S103, and continues to monitor the output from the bucket angle sensor 26.

In Step S104, the transport start determination section 54 outputs to the outside the determination that the transporting operation is over (the loading operation has started), and returns to Step S100. A determination output destination at this time includes the load computing section 52.

Computing of Lad Value by Load Computing Section 52

Figure 7:
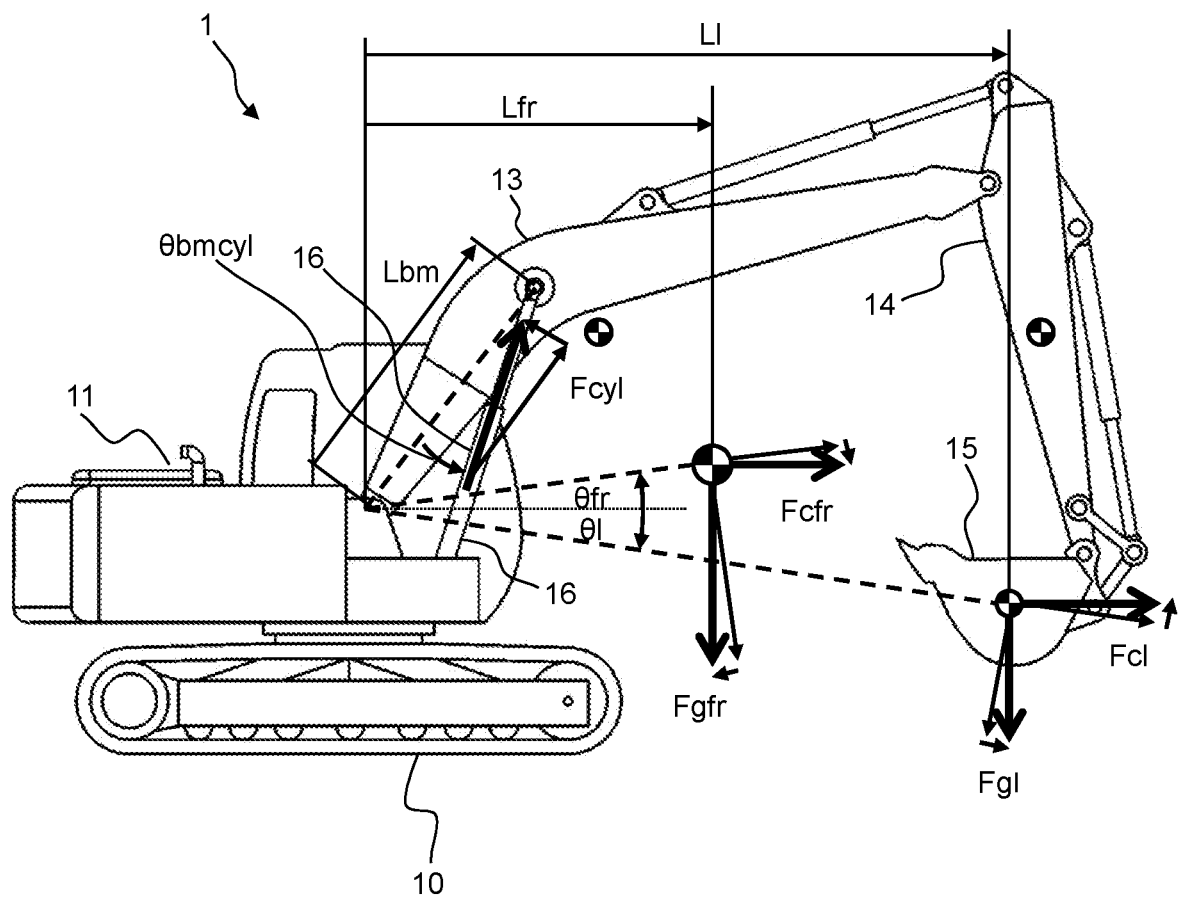
FIG. 7 is an explanatory diagram of a method of computing a momentary load Ml of a work target material within a bucket by a load computing section.

FIG. 7 is an explanatory diagram of a method of computing a momentary load Ml of the work target material within the bucket 15 by the load computing section 52 in the controller 21. The method of computing the load by the load computing section 52 will be described with reference to FIG. 7. Measurement of the load uses a balance among a torque generated by the boom cylinder 16, a torque generated by the front work implement 12 using a gravitational force and a swing centrifugal force, and a torque generated by a loaded material using the gravitational force and the swing centrifugal force, that act around the rotating shaft of the boom 13.

A thrust Fcyl of the boom cylinder 16 is calculated using the following Equation (1) by defining that an output signal from the boom bottom pressure sensor 29 is P1, an output signal from the boom rod pressure sensor 30 is P2, and pressure receiving areas of the boom cylinder 16 are A1 and A2.

$$Fclbm = A1 \cdot P1 - A2 \cdot P2 \quad (1)$$

A torque Tbm generated by the boom cylinder 16 is calculated using the following Equation (2) by defining that a length of a segment connecting the boom rotating shaft and a point of application of the thrust of the boom cylinder 16 is Lbm, and an angle formed between a segment Lbm and a direction of the thrust Fcyl of the boom cylinder 16 is θbmcyl.

$$Tbm = Fcyl \cdot Lbm \cdot \sin(\theta bmcyl) \quad (2)$$

A torque Tgfr generated by the front work implement 12 using the gravitational force is calculated using the following Equation (3) by defining that a weight of a center of gravity of the front work implement 12 is Mfr, a gravitational acceleration is g, a longitudinal length from the boom rotating shaft to a center of gravity of the front implement is Lfr, and an angle formed between a segment connecting the boom rotating shaft to the center of gravity of the front implement and a horizontal surface is θfr.

$$Tgfr = Mfr \cdot g \cdot Lfr \cdot \cos(\theta fr) \quad (3)$$

A torque Tcfr generated by the front work implement 12 using the swing centrifugal force is calculated using the following Equation (4) by defining that a swing angular velocity is ω.

$$Tcfr = Mfr \cdot Lfr \cdot \omega^2 \cdot \sin(\theta fr) \quad (4)$$

It is noted that Mfr, Lfr, and θfr are calculated from the preset positions of centers of gravity and preset weights of the boom 13, the arm 14, and the bucket 15, and angle signals output from the boom angle sensor 24, the arm angle sensor 25, and the bucket angle sensor 26.

A torque Tgl generated by the loaded material using the gravitational force is calculated using the following Equation (5) by defining that a weight of the loaded material is Ml, a longitudinal length from the boom rotating shaft to the center of gravity of the bucket is Ll, and an angle formed between a segment connecting the boom rotating shaft to a center of gravity of the loaded material and the horizontal surface is θl.

$$Tgl = Ml \cdot g \cdot Ll \cdot \cos(\theta l) \quad (5)$$

A torque Tcl generated by the loaded material using the swing centrifugal force is calculated by the following Equation (6).

$$Tcl = Ml \cdot Ll \cdot \omega^2 \cdot \sin(\theta l) \quad (6)$$

When the balance among Equations (2) to (6) is modified and the Equations are expanded with respect to the loaded material weight Ml, the loaded material weight Ml is calculated by the following Equation (7).

$$Ml = (Tbm - Tgfr - Tcfr)/(Ll \cdot (g \cdot \cos(\theta l) + \omega^2 \cdot \sin(\theta l))) \quad (7)$$

In computing the load from Equations (1) to (7), the loaded material weight Ml is not constant during time periods such as the time of start or end of operation during which the operation of the front work implement 12 is unstable due to an influence of an inertial force of the front work implement 12, characteristics of the hydraulic circuit, and the like; thus, it is desirable to definitively determine the load using an output result of the loaded material weight Ml during a predetermined time period during which the boom rotates at a constant velocity during the transporting work.

Figure 8:
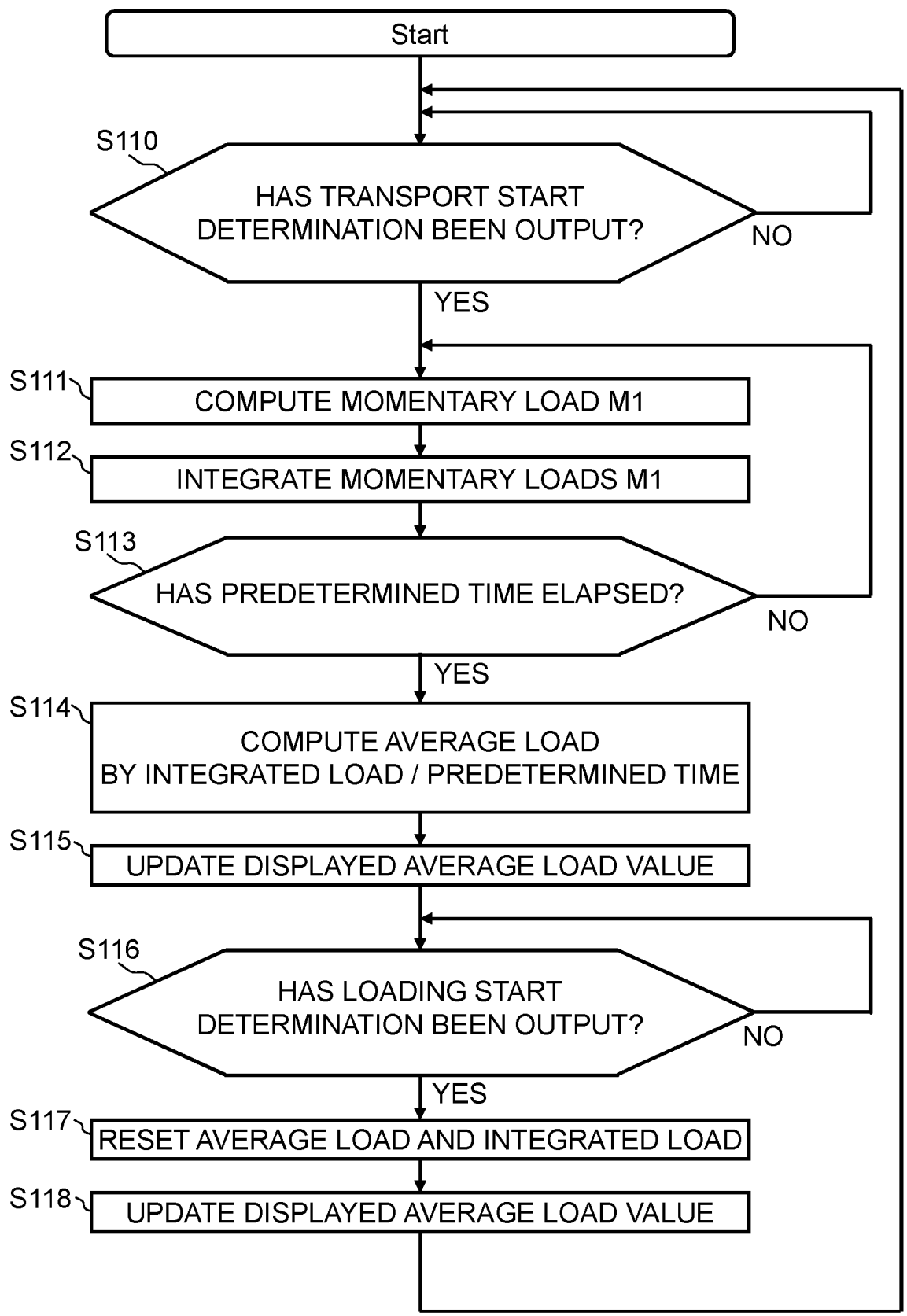
FIG. 8 is a flowchart of a load definitive process executed by the load computing section in Embodiment 1.
Figure 9:
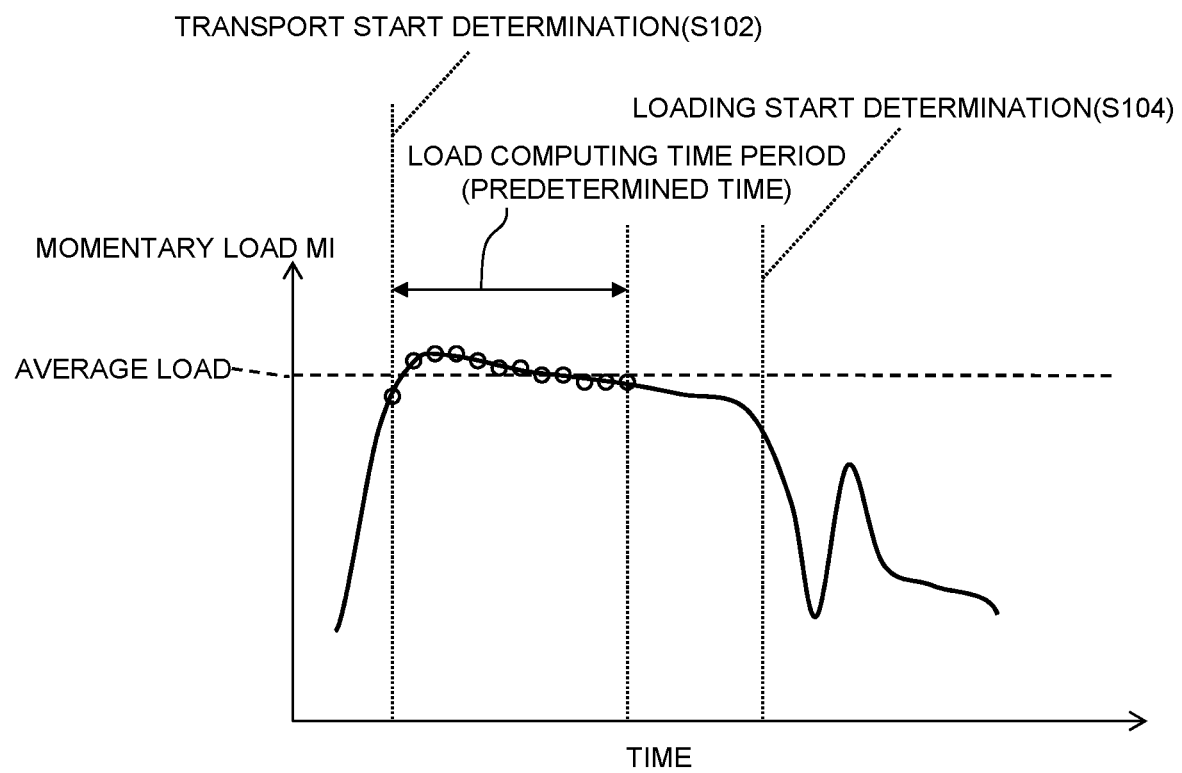
FIG. 9 is a graph depicting a time change of the momentary load Ml computed by the load computing section.

FIG. 8 is a flowchart of a load definitive process executed by the load computing section 52 in the present embodiment, and FIG. 9 is a graph depicting a time change of the momentary load Ml computed by the load computing section 52. A method of determining and outputting the load by the load computing section 52 will be described with reference to FIGS. 8 and 9.

Steps of FIG. 8 are executed per preset sampling period in the controller 21.

In Step S110, the controller 21 (load computing section 52) monitors whether the transport start determination (Step S102 of FIG. 5) has been output from the transport start determination section 54. In a case in which the transport start determination has been output, the controller 21 (load computing section 52) goes to Step S111; otherwise, the controller 21 (load computing section 52) returns to before Step S110 and monitors the output from the transport start determination section 54.

The controller 21 (load computing section 52) performs computing related to Equations (1) to (7) to compute the momentary excavated material weight (momentary load value) Ml in Step S111, then integrates momentary loads Ml in Step S112, and goes to Step S113.

In Step S113, the load computing section 52 determines whether the predetermined time has elapsed since output of the transport start determination from the transport start determination section 54. In a case in which the predetermined time has not elapsed, the load computing section 52 returns to before Step S111 and re-executes Steps S111 and S112. On the other hand, in a case in which the predetermined time has elapsed, the load computing section 52 goes to Step S114.

In Step S114, the load computing section 52 divides an integrated value of the momentary loads Ml by the predetermined time to compute an average load of the momentary loads Ml for the predetermined time. As depicted in FIG. 9, the momentary load Ml (refer to a white circle in FIG. 9) varies depending on sampling; thus, in the present embodiment, calculating an average of the momentary loads Ml enables the load computing section 52 to definitively determine the load of the work target material. At this time, in a case in which time for which a rotation angular velocity of the boom 13 is constant is short, then a fluctuation in the momentary load Ml increases for the predetermined time (load value computing time period in FIG. 9), and there is a concern that a definitive value greatly deviates from an actual load. Furthermore, there is a concern that the predetermined time cannot be ensured in the first place depending on the posture of the front work implement 12. When the load value is definitively determined in Step S114, the load computing section 52 next goes to Step S115.

The load computing section 52 updates in Step S115 the load value (refer to FIG. 22) displayed on the monitor 23, and goes to Step S116.

In Step S116, the load computing section 52 monitors whether the loading start determination has been output from the transport start determination section 54. In a case of determining herein that the loading start determination has not been output, the load computing section 52 returns to before Step S116 and continues to monitor the output from the transport start determination section 54. In a case of determining that the loading start determination has been output, the load computing section 52 goes to Step S117.

The load computing section 52 resets the integrated value and the average value of the momentary loads Ml to zero in Step S117, and then updates the load value displayed on the monitor 23 and returns to before Step S110 in Step S118.

Computing of Velocity Limiting Value Vlim of Boom Cylinder 16 by Velocity Limiting Value Computing Section 55

Figure 10:
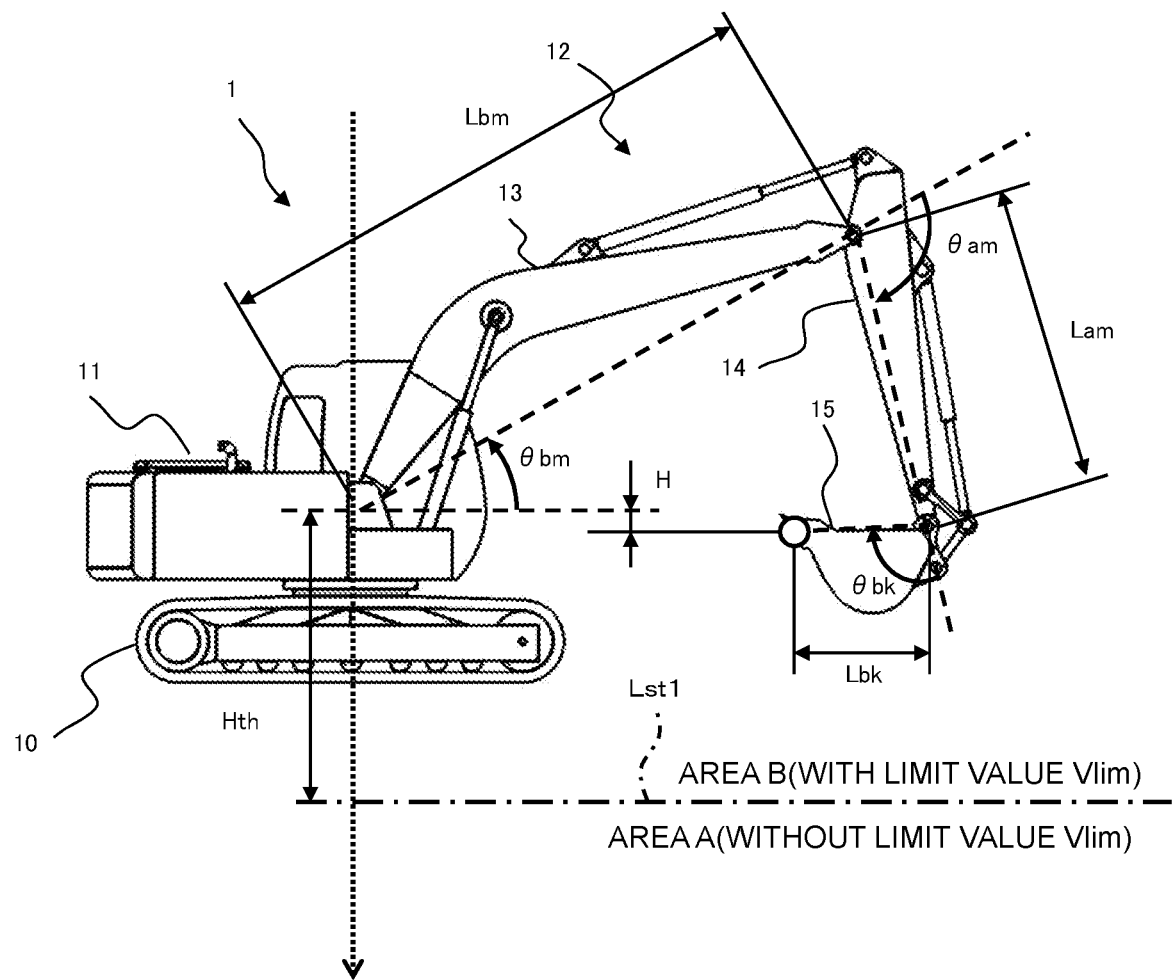
FIG. 10 is an explanatory diagram of a method of computing a velocity limiting value Vlim of a boom cylinder by a velocity limiting value computing section in a controller in Embodiment 1.
Figure 11:
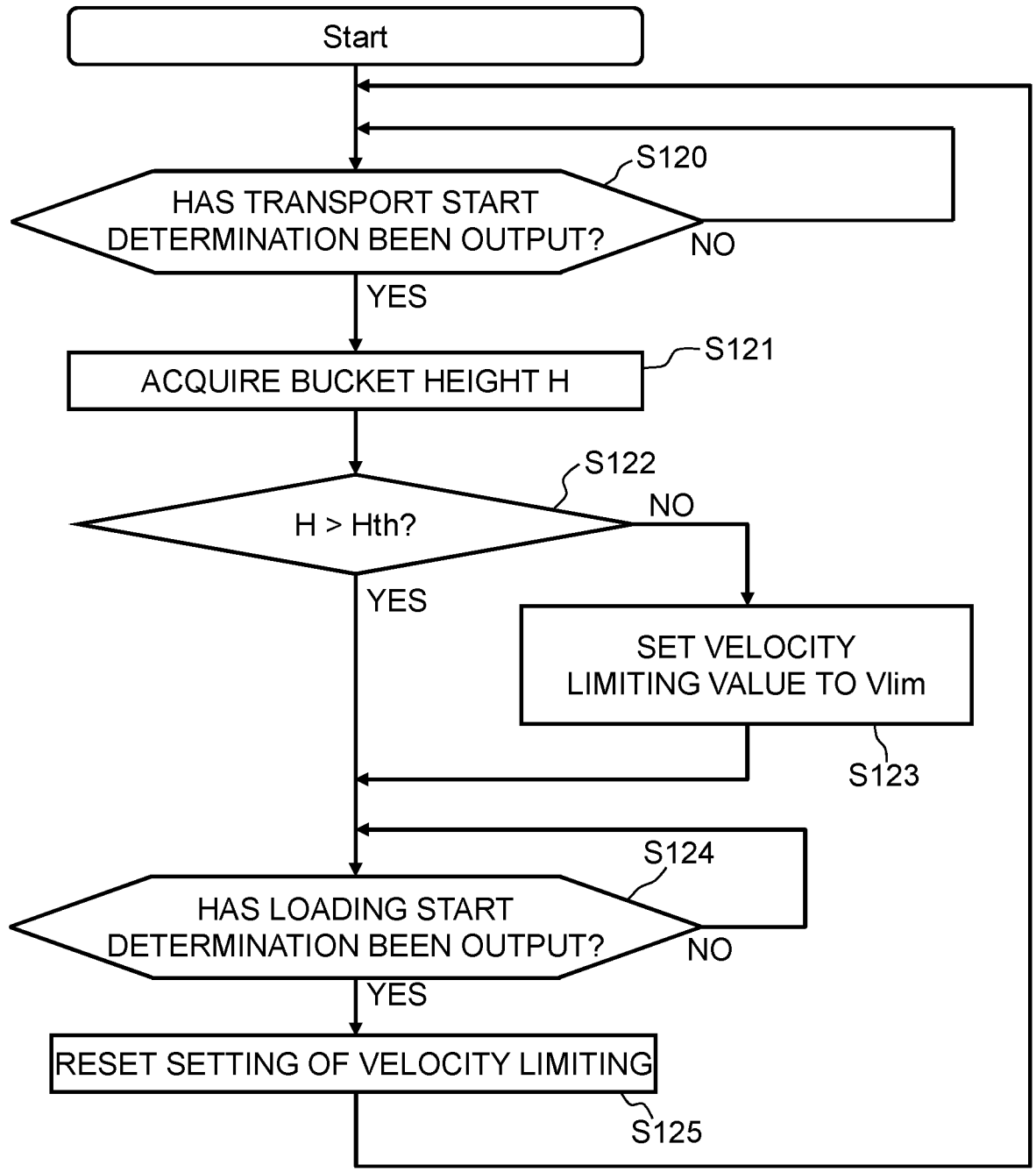
FIG. 11 is a flowchart depicting a computing process for computing the velocity limiting value Vlim of the boom cylinder executed by the velocity limiting value computing section in Embodiment 1.

FIG. 10 is an explanatory diagram of a method of computing the velocity limiting value Vlim of the boom cylinder 16 by the velocity limiting value computing section 55 in the controller 21, and FIG. 11 is a flowchart depicting a computing process for computing the velocity limiting value Vlim of the boom cylinder 16 executed by the velocity limiting value computing section 55 in the present embodiment. A method of changing the velocity limiting value Vlim on the basis of an output from the posture computing section 53 by the velocity limiting value computing section 55 will be described with reference to FIGS. 10 and 11.

In the present embodiment, while assuming a height of a tip end position of the front work implement 12 (claw tip position of the bucket 15) as a reference of the posture of the front work implement 12 as depicted in FIG. 10, the posture computing section 53 continuously computes in a predetermined period the height of the tip end position of the front work implement 12 as a vertical distance from a rotation center of the boom 13 to the tip end position of the bucket 15 (tip end height of the work implement), H. The vertical distance H is computed by the following Equation (8). It is defined that the rotation center of the boom 13 is a reference, vertically below the rotation center is positive, and vertically above the rotation center is negative.

$$H = Lbm \cdot \sin(\theta bm) + Lam \cdot \sin(\theta bm + \theta am) + Lbk \cdot \sin(\theta bm + \theta am + \theta bm) \quad (8)$$

In the present embodiment, a reference line Lst1 in parallel to the bottom surface of the lower travel structure 10 is preset at a predetermined position below a bottom surface of the hydraulic excavator 1 (bottom surface of the lower travel structure 10), and setting is made such that velocity limiting is not imposed in an area A below the reference line Lst1 and velocity limiting can be imposed in an area B above the reference line Lst1. A height of the reference line Lst1 with reference to the rotation center of the boom 13 (vertical distance of the reference line Lst1 to the rotation center of the boom 13) is a set value Hth. In the present embodiment, whether the velocity limiting value of the boom cylinder 16 is imposed is classified depending on whether the height position of the bucket claw tip exceeds the height of the reference line Lst1 (that is, whether the bucket claw tip is present in the area A or B) at a time of starting the transporting operation.

As depicted in the flowchart of FIG. 11, the velocity limiting value computing section 55 monitors whether the transport start determination has been output from the transport start determination section 54 in Step S120. In a case in which the transport determination has been output, the velocity limiting value computing section 55 acquires the vertical distance H from the posture computing section 53 in Step S121 and goes to Step S122; otherwise, the velocity limiting value computing section 55 returns to before Step S120 and monitors the output from the transport start determination section 54.

In Step S122, the velocity limiting value computing section 55 compares the vertical distance H with the set value Hth to determine a magnitude relationship between the vertical distance H and the set value Hth. In a case of determining herein that the vertical distance H is smaller than the set value Hth, the velocity limiting value computing section 55 determines that the bucket claw tip is present in the area B, sets the velocity limiting value of the boom cylinder 16 to the preset velocity limiting value Vlim in Step S123, and goes to Step S124. On the other hand, in a case of determining that the vertical distance H is larger than the set value Hth, the velocity limiting value computing section 55 determines that the bucket claw tip is present in the area A, and goes to Step S124 without setting the velocity limiting value.

In Step S124, the velocity limiting value computing section 55 monitors whether the loading start determination has been output from the transport start determination section 54. In a case of determining herein that the loading determination has been output, the velocity limiting value computing section 55 goes to Step S125; otherwise, the velocity limiting value computing section 55 returns to before Step S124 and monitors the output from the transport start determination section 54.

The velocity limiting value computing section 55 resets in Step S125 setting of the velocity limiting, and returns to before Step S120.

First, the velocity command correction section 50 determines whether the velocity limiting value computing section 55 has computed the velocity limiting value Vlim of the boom cylinder 16. In a case of determining that the velocity limiting value computing section 55 has not computed the velocity limiting value Vlim, the velocity command correction section 50 outputs the velocity command from the operation lever 22 to the drive signal generation section 51 as it is. On the other hand, in a case of determining that the velocity limiting value computing section 55 has computed the velocity limiting value Vlim, the velocity command correction section 50 determines whether the boom cylinder velocity specified by the velocity command from the operation lever 22 exceeds the velocity limiting value Vlim. In a case of determining that the boom cylinder velocity exceeds the velocity limiting value Vlim, the velocity command correction section 50 corrects the velocity command in such a manner that the boom cylinder velocity is equal to the velocity limiting value Vlim and outputs the corrected velocity command to the drive signal generation section 51. On the other hand, in a case of determining that the boom cylinder velocity does not exceed the velocity limiting value Vlim, the velocity command correction section 50 outputs the velocity command from the operation lever 22 to the drive signal generation section 51 as it is.

The drive signal generation section 51 generates the drive signal for the control valve 35 corresponding to the boom cylinder 16 on the basis of the velocity command input from the velocity command correction section 50, and outputs the generated drive signal to the control valve 35. The opening degree of the control valve 35 is adjusted by this drive signal, and the velocity of the boom cylinder 16 is controlled on the basis of the velocity command from the velocity command correction section 50.

Operations

Figure 12:
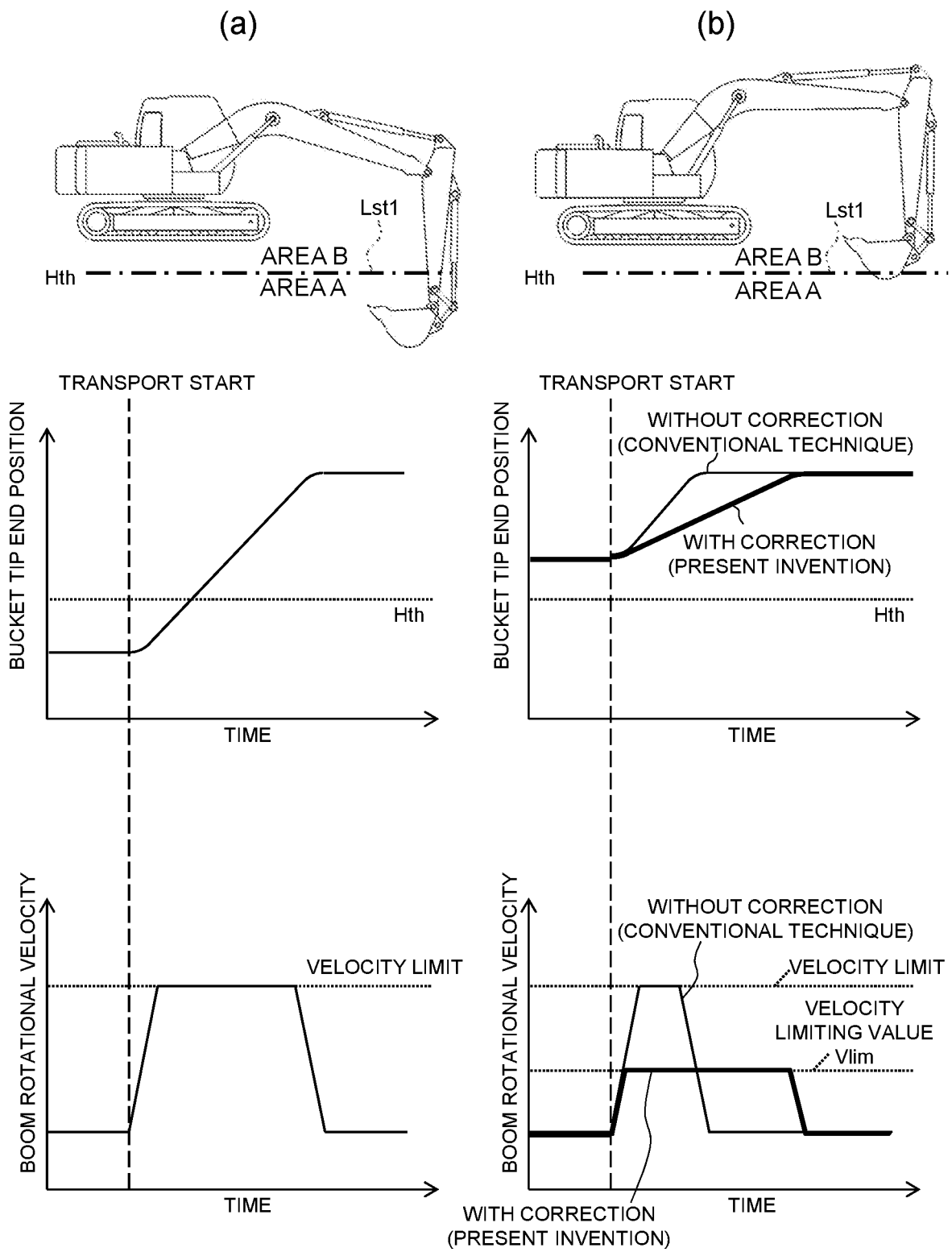
FIG. 12 are explanatory diagrams of a boom cylinder velocity control process by the controller in Embodiment 1.

Operations performed by the hydraulic excavator 1 configured as described above will be described with reference to FIG. 12. FIG. 12 are explanatory diagrams of a velocity control process on the boom cylinder 16 performed by the controller 21 in the present embodiment.

An upper diagram of FIG. 12(a) depicts a posture at the time of starting the transporting operation in the lower-side excavation work depicted in FIG. 4A, a middle diagram thereof depicts a graph of a time change of the height of the bucket tip end position during the transporting operation in the lower-side excavation work, and a lower diagram thereof depicts a graph of a time change of the boom rotational velocity (expansion velocity of the boom cylinder 16) during the transporting operation in the lower-side excavation work.

An upper diagram of FIG. 12(b) depicts a posture at the time of starting the transporting operation in the upper-side excavation work depicted in FIG. 4B, a middle diagram thereof depicts a graph of a time change of the height of the bucket tip end position during the transporting operation in the upper-side excavation work, and a lower diagram thereof depicts a graph of a time change of the boom rotational velocity (expansion velocity of the boom cylinder 16) during the transporting operation in the upper-side excavation work. In FIG. 12(b), "without correction" indicates graphs of a case of the conventional technique in which the velocity command correction section 50 does not correct the velocity command (that is, it does not impose the velocity limiting), and "with correction" indicates graphs of the present invention in which the velocity command correction section 50 corrects the velocity command (that is, it imposes the velocity limiting). It is noted that the boom rotational velocity in the lower parts of FIG. 12 can be rephrased as the expansion velocity of the boom cylinder 16.

In a case of executing swing/boom raising and starting the transporting operation after end of the excavating operation by the hydraulic excavator 1, the rotational velocity of the boom 13 is increased after start of the transporting operation, is kept unchanged for a while after reaching a certain velocity, and is finally decreased and the boom 13 stops rotating in both cases of (a) and (b), as depicted in the bottom graphs of FIG. 12.

As depicted in FIG. 12(a), in the case in which the height H of the bucket claw tip is larger than the set value Hth at the time of starting the transporting operation (that is, the bucket claw tip is present in the area A below the reference line Lst1), then a moving distance of the bucket claw tip in a height direction is relatively long until the bucket claw tip reaches above the cargo stand of the dump truck 2 from the height H, and the time period during which the boom rotational velocity is constant (equal to a velocity limit value) can be sufficiently ensured during the transporting operation; thus, it is possible to sufficiently ensure the number of times of sampling of the momentary load Ml and ensure accuracy of the load value of the work target material.

On the other hand, as depicted in the graphs indicated by "without correction" of FIG. 12(b), in the case in which the height H of the bucket claw tip is smaller than the set value Hth (that is, the bucket claw tip is present in the area B above the reference line Lst1) at the time of starting the transporting operation, then the moving distance of the bucket claw tip in the height direction is relatively short, and it is impossible to sufficiently ensure the time period during which the boom rotational velocity is constant (equal to the velocity limit value) during the transporting operation; thus, the number of times of sampling of the momentary load Ml decreases and an error, therefore, tends to occur to the load value.

To address the problem, in the present embodiment, the velocity limiting value Vlim that is a lower value than the velocity limit value is provided to the boom rotational velocity as depicted in the graph indicated by "with correction" of FIG. 12(b). Providing the velocity limiting value Vlim in this way makes it possible to ensure a longer time until the bucket claw tip reaches above the cargo stand of the dump truck 2 than the time in the case of "without correction". This can sufficiently ensure the time period during which the boom rotational velocity is constant (equal to the velocity limiting value Vlim) during the transporting operation; thus, it is possible to sufficiently ensure the number of times of sampling of the momentary load Ml and ensure the accuracy of the load value of the work target material.

Correcting the velocity command to the boom cylinder 16 on the basis of the height of the claw tip of the bucket 15 at the time of starting the transporting operation in this way makes it possible to realize operations of the front work implement 12 appropriate for load measurement and adapted to a work form; thus, it is possible to accurately measure the load of the work target material without relying on the work environment or the operator's operational skill.

Embodiment 2

Embodiment 2 of the present invention will next be described. While the velocity limiting value Vlim is constant in Embodiment 1, the velocity limiting value Vlim may be changed depending on the height position of the bucket claw tip at the time of starting the transporting operation. For example, the velocity limiting value Vlim may be set such that the velocity limiting value Vlim decreases as the height position of the bucket claw tip moves upward from the position of the reference line Lst1 (FIG. 11) to facilitate velocity limiting. In other words, when the bucket claw tip is present above the reference line Lst1, setting may be made such that the velocity limiting value Vlim decreases in proportion to an increase in the distance between the reference line Lst1 and the bucket claw tip.

Figure 13:
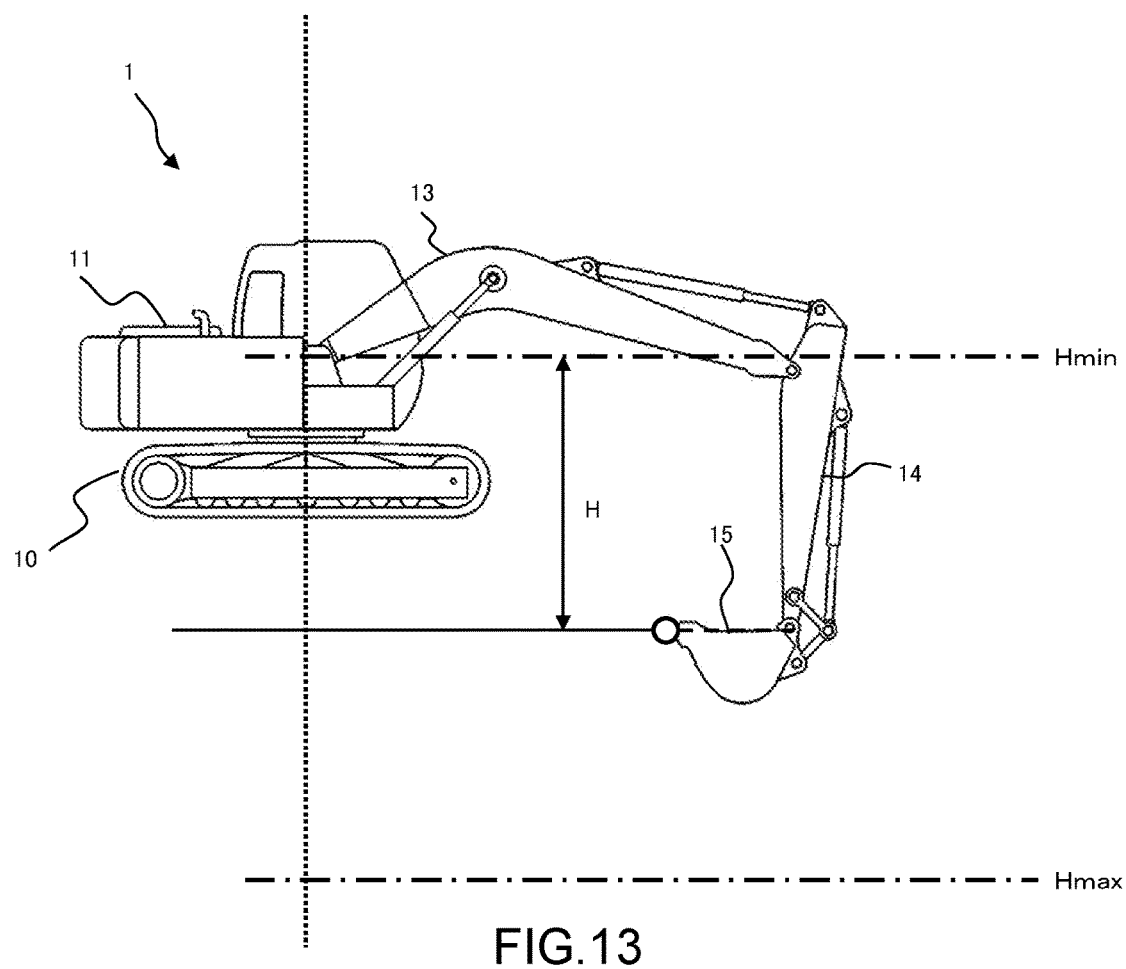
FIG. 13 is an explanatory diagram of Hmin and Hmax used by the velocity limiting value computing section at a time of computing the velocity limiting value Vlim in Embodiment 2.
Figure 14:
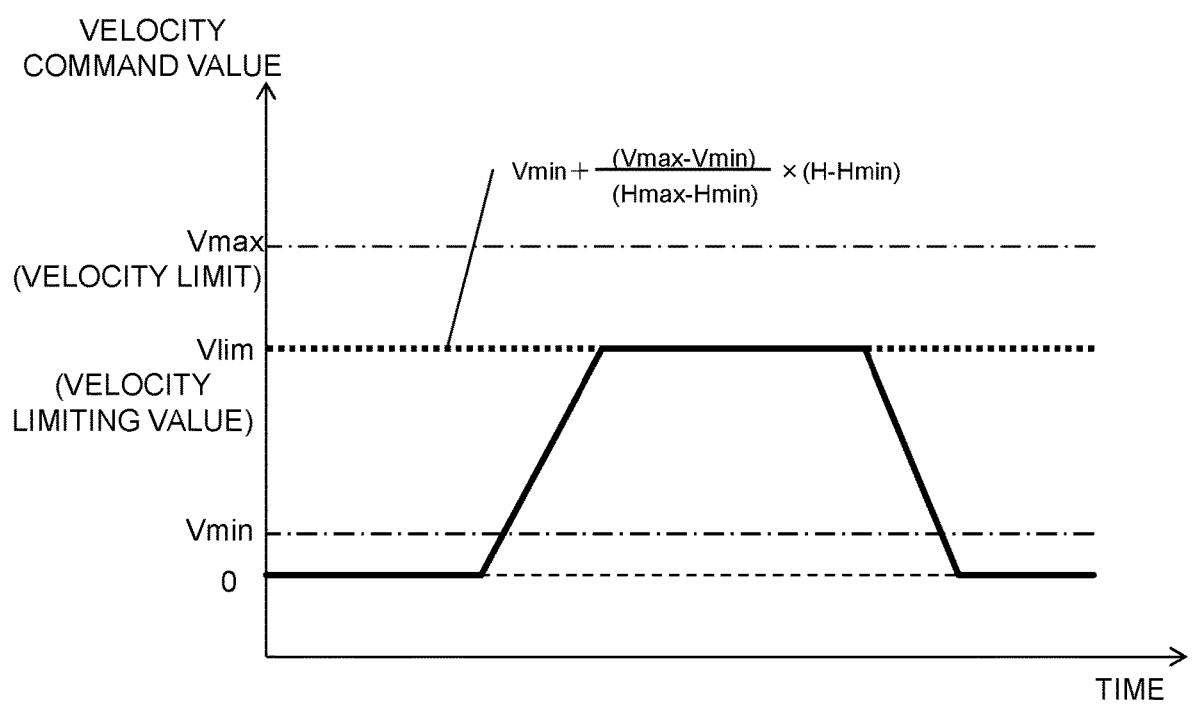
FIG. 14 is a graph depicting time changes of the velocity limiting value Vlim computed by the velocity limiting value computing section and a boom cylinder velocity command value in Embodiment 2.

Furthermore, a method to be described with reference to FIGS. 13 and 14 are one of the other methods of setting the velocity limiting value Vlim. FIG. 13 is an explanatory diagram of Hmin and Hmax used when the velocity limiting value computing section 55 in the present embodiment computes the velocity limiting value Vlim, and FIG. 14 is a graph depicting time changes of the velocity limiting value Vlim computed by the velocity limiting value computing section 55 and a velocity command value to the boom cylinder 16 in the present embodiment. It is noted that a configuration of the present embodiment is the same as that of Embodiment 1 except that a method of computing the velocity limiting value Vlim by the velocity limiting value computing section 55 is different; thus, description of the same parts will be omitted.

As depicted in FIG. 13, the velocity limiting value computing section 55 in the present embodiment records, in advance, two set values Hmin and Hmax (Hmin Hmax) for the vertical distance to the boom rotation center. Hmin is set to the boom rotation center and Hmax is set to a maximum movable range of the bucket claw tip. Furthermore, the velocity limiting value computing section 55 sets the velocity limiting value Vlim represented by the following Equation (9) using the two velocity set values Vmax and Vmin (Vmin<Vmax), and thereby replaces the area determination and the set value call in Steps S122 and S123 depicted in FIG. 11. In the following Equation (9), setting is made such that the velocity limiting value Vlim decreases in proportion to a decrease in a value of H.

$$V\text{lim}=V\text{min}+(V\text{max}-V\text{min})\cdot(H-H\text{min})/(H\text{max}-H\text{min}) \quad (9)$$

Making setting such that the setting of the velocity limiting value Vlim continuously changes depending on the height H in this way makes it possible to correct the drive command more appropriately; thus, the boom rotational velocity is constant without relying on a change in the work environment or the operator's operational skill and it is possible to improve the accuracy of load measurement.

Embodiment 3

Embodiment 3 of the present invention will next be described. The present embodiment is characterized in that the velocity limiting value Vlim is set in light of a relative distance Ht between the hydraulic excavator 1 and the dump truck 2 in the vertical direction.

Figure 15:
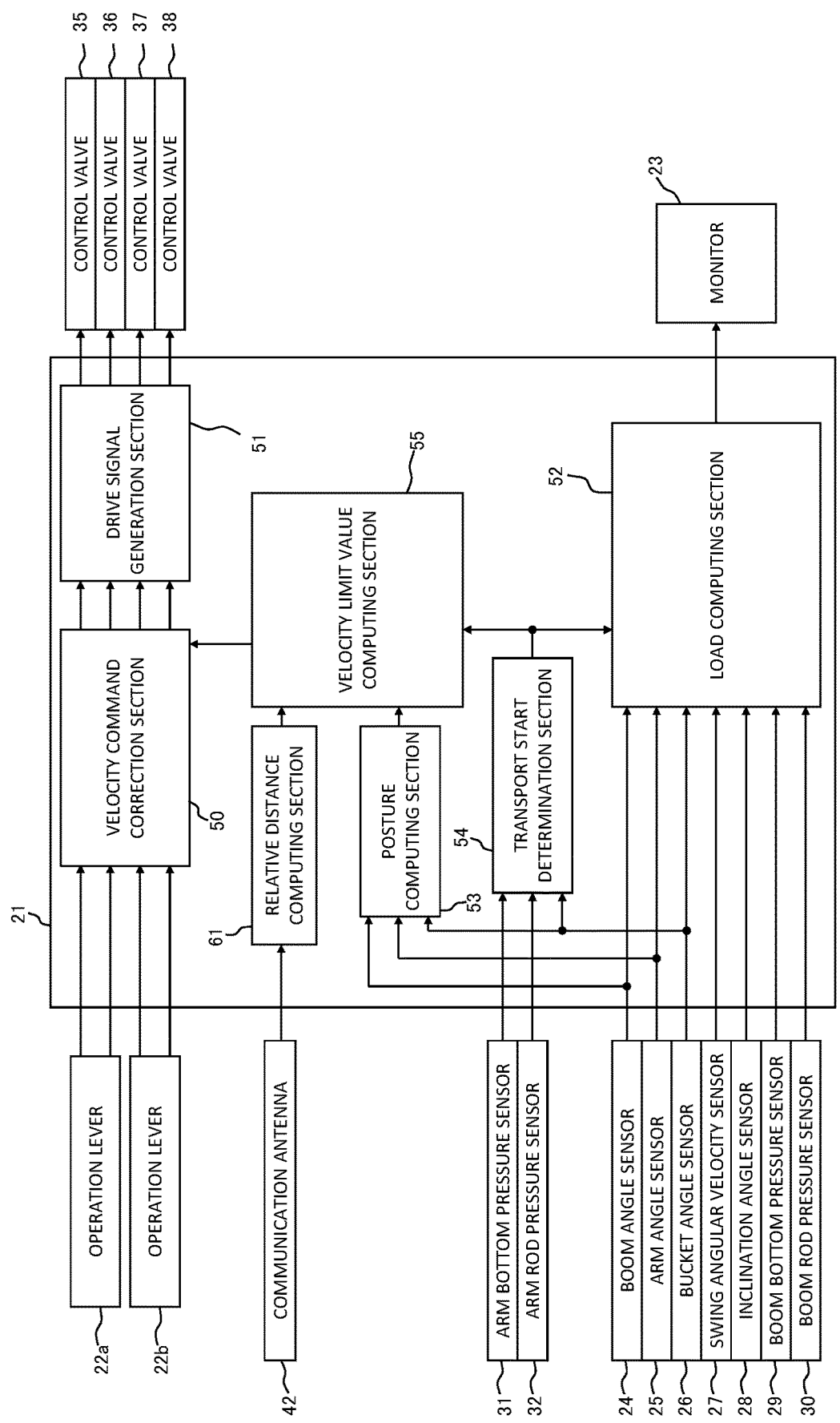
FIG. 15 is a system configuration diagram of a load measurement system in Embodiment 3.

FIG. 15 is a system configuration diagram of a load measurement system in the present embodiment. The hydraulic excavator 1 in the present embodiment is provided with a communication antenna 42 in addition to the configuration of the hydraulic excavator 1 in Embodiment 1, and configured to be capable of receiving information from an external terminal via the communication antenna 42. The controller 21 in the present embodiment is further provided with a relative distance computing section 61 that computes the relative distance Ht between the hydraulic excavator 1 and the dump truck 2 in the vertical direction on the basis of the position information about the hydraulic excavator 1 and the position information about the dump truck (transporting machine) 2 that is a loading work target, in addition to the configuration of the controller 21 in Embodiment 1. Furthermore, the velocity limiting value computing section 55 in the present embodiment is configured to compute the velocity limiting value Vlim on the basis of outputs from the posture computing section 53, the transport start determination section 54, and the relative distance computing section 61. The other parts are the same as those in Embodiment 1.

Figure 16:
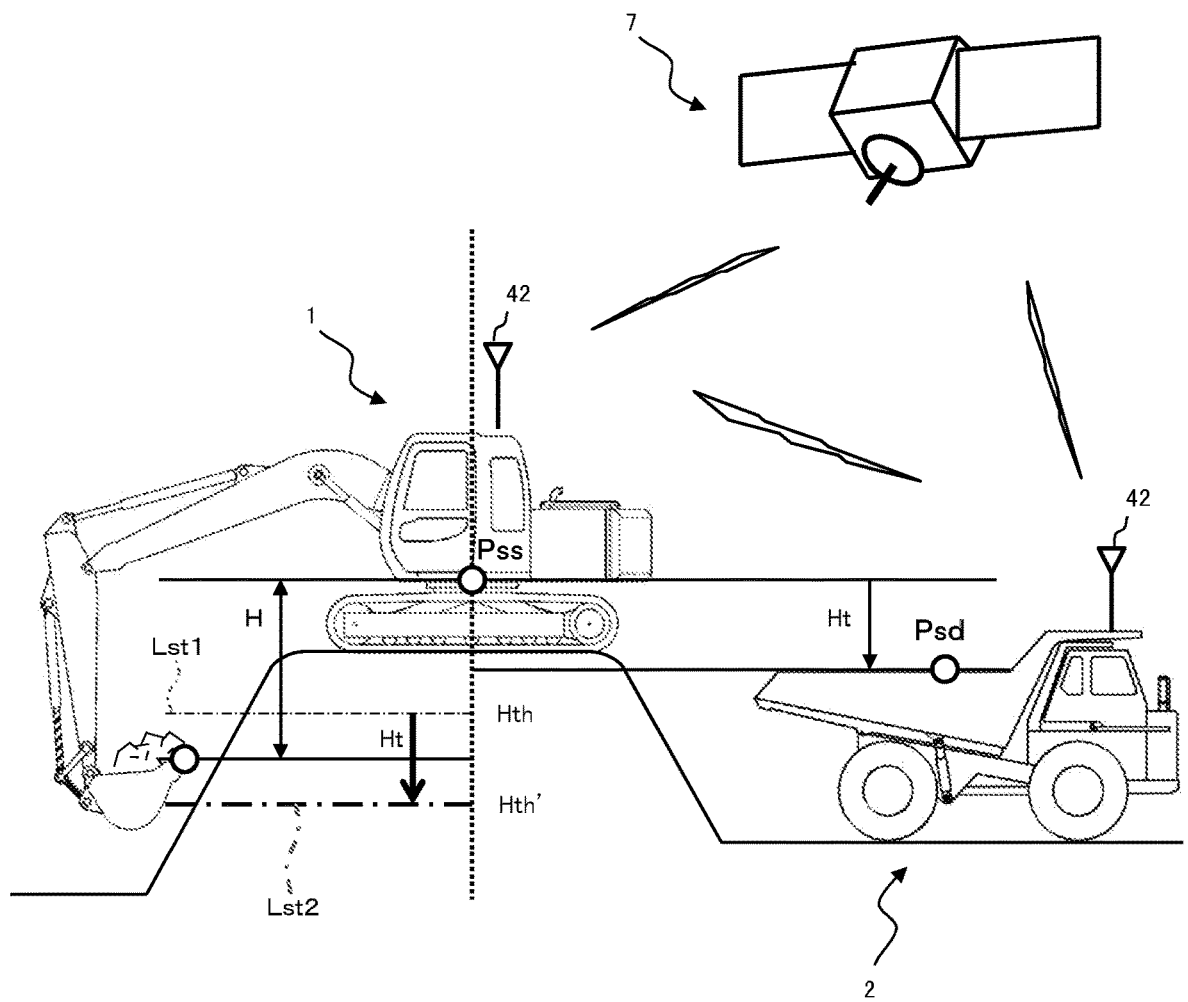
FIG. 16 is a schematic diagram depicting a method of computing a relative distance between the hydraulic excavator and a dump truck according to Embodiment 3.

FIG. 16 is a schematic diagram depicting a method of computing the relative distance between the hydraulic excavator 1 and the dump truck 2 according to the present embodiment. In this example, a reference point Pss of the hydraulic excavator 1 is set to the rotation center of the boom 13, while a reference point Psd of the dump truck 2 is set to an upper end of the cargo stand.

The dump truck 2 receives a radio wave transmitted from a ranging satellite 7 via the communication antenna 42 mounted therein, computes coordinates (absolute coordinates) of the reference point Psd of the dump truck 2 in a global coordinate system on the basis of the radio wave, and transmits a computing result to the hydraulic excavator 1. Likewise, the controller 21 of the hydraulic excavator 1 receives a radio wave transmitted from the ranging satellite 7 via the communication antenna 42, and computes coordinates (absolute coordinates) of the reference point Pss of the hydraulic excavator 1 in the global coordinate system on the basis of the radio wave. Furthermore, the controller 21 computes the relative distance Ht between the hydraulic excavator 1 and the dump truck 2 in the vertical direction on the basis of the coordinate information about the reference point Psd transmitted from the dump truck 2 and the coordinate information about the reference point Pss of the hydraulic excavator 1. The controller 21 sets a new set value Hth' for the vertical distance to classify the posture of the front work implement 12 at the time of starting the transporting operation, by the following Equation (10) using the relative distance Ht. In other words, the velocity limiting value computing section 55 in the present embodiment determines whether to set the velocity limiting value Vlim to the boom cylinder velocity with reference to a new reference line Lst2 obtained by moving downward the reference line Lst1 at the height Hth by the relative distance Ht.

$$Hth'=Hth+Ht \quad (10)$$

The controller 21 executes a process in Step S122 of the flowchart of FIG. 11 with the set value Hth replaced by the set value Hth' to determine whether to set the velocity limiting value Vlim to the boom cylinder velocity. The controller 21 in the present embodiment thereby corrects the velocity command from the operation lever 22 (sets the velocity limiting value Vlim) in proportion to the bucket claw tip position (height H) and the relative distance (Ht) between the hydraulic excavator 1 and the dump truck 2 at the time of starting the transporting operation.

In an example depicted in FIG. 16, in a case of comparing the vertical distance H of the claw tip with the set value Hth to determine a magnitude relationship between the vertical distance H of the claw tip and the set value Hth and determining the setting of the velocity limiting value Vlim without consideration to the relative distance Ht between the hydraulic excavator 1 and the dump truck 2 as in Embodiment 1, the controller 21 determines in Step S122 no-velocity limiting since the set value Hth is smaller than the vertical distance H. However, an actual loading location (reference point Psd of the dump truck 2) is below the reference point Pss of the hydraulic excavator 1 by the relative distance Ht; thus, there are cases in which the time period during which the rotation angular velocity of the boom 13 is constant cannot be sufficiently ensured.

By contrast, in a case of using the new set value Hth' for the vertical distance for a criterion as in the present embodiment, the controller 2 sets velocity limiting in the determination process in Step S122; thus, the rotational velocity of the boom 13 can be kept down to the velocity limiting value Vlim and it is possible to sufficiently ensure the time period during which the rotation angular velocity of the boom 13 is constant. Correcting the velocity command in light of the relative distance Ht to the dump truck 2 in the vertical direction in this way makes it possible to appropriately correct the velocity command even in an environment in which a position relationship with the dump truck 2 in the vertical direction is frequently changed and to improve the accuracy of load measurement.

While a case in which the reference point Psd of the dump truck 2 is below the reference point Pss of the hydraulic excavator 1 has been described in the example of FIG. 16, the present invention is similarly applicable to a case in which the reference point Psd of the dump truck 2 is above the reference point Pss of the hydraulic excavator 1. In this case, however, it is possible to perform the same processes as those in Embodiment 1.

It is noted that the controller 21 may be configured, as an alternative to the process for comparing the set value Hth' with the vertical distance H, to calculate a moving height (H-Ht) of the bucket claw tip in the transporting operation by subtracting the relative distance Ht from the vertical distance H, to determine whether a value of the moving height (H-Ht) exceeds the reference line Lst1, and to set the velocity limiting value Vlim in a case of determining that the value exceeds the reference line Lst1.

Embodiment 4

Embodiment 4 of the present invention will next be described. The present embodiment is characterized in that a stability of the load value computed by the load computing section 52 is determined, and that the velocity command output from the operation lever 22 is subjected to a low-pass filter process in a case in which it is determined that the load value is not stable. Examples of a cause for making the load value unstable include input of a quick operation to the operation lever 22.

Figure 17:
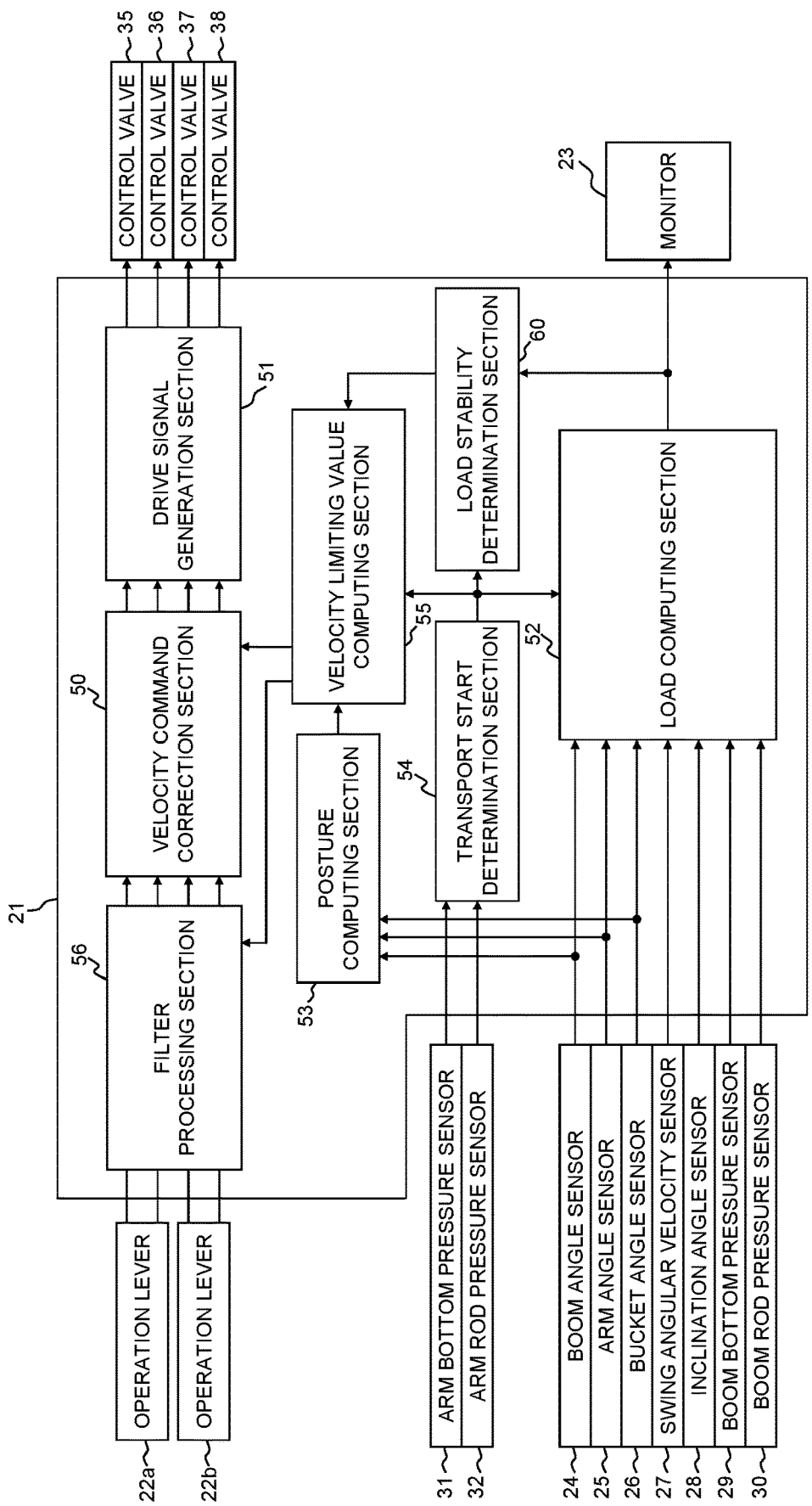
FIG. 17 is a system configuration diagram of a load measurement system in Embodiment 4.

FIG. 17 is a system configuration diagram of a load measurement system in the present embodiment. The controller 21 in the present embodiment is further provided with a load stability determination section 60 and a filter processing section 56 in addition to the configurations of Embodiment 1. The other parts are the same as those in Embodiment 1.

The load stability determination section 60 determines whether the load value of the work target material is stable on the basis of an aspect of the time change of the load value of the work target material computed by the load computing section 52. The filter processing section 56 subjects the velocity command generated by the operation lever 22 to the low-pass filter process in the case in which the load stability determination section 60 determines that the load value of the work target material is not stable. Furthermore, the velocity command correction section 50 in the present embodiment corrects the velocity command having been subjected to the low-pass filter process by the filter processing section 56 (hereinafter, often referred to as "filter velocity command") in such a manner that the boom cylinder velocity specified by the filter velocity command is equal to the velocity limiting value Vlim when the boom cylinder velocity exceeds the velocity limiting value Vlim computed by the velocity limiting value computing section 55, and outputs the corrected filter velocity command to the drive signal generation section 51. In addition, the velocity command correction section 50 outputs the filter velocity command to the drive signal generation section 51 without correcting the filter velocity command when the boom cylinder velocity specified by the filter velocity command is equal to or lower than the velocity limiting value Vlim.

Figure 18:
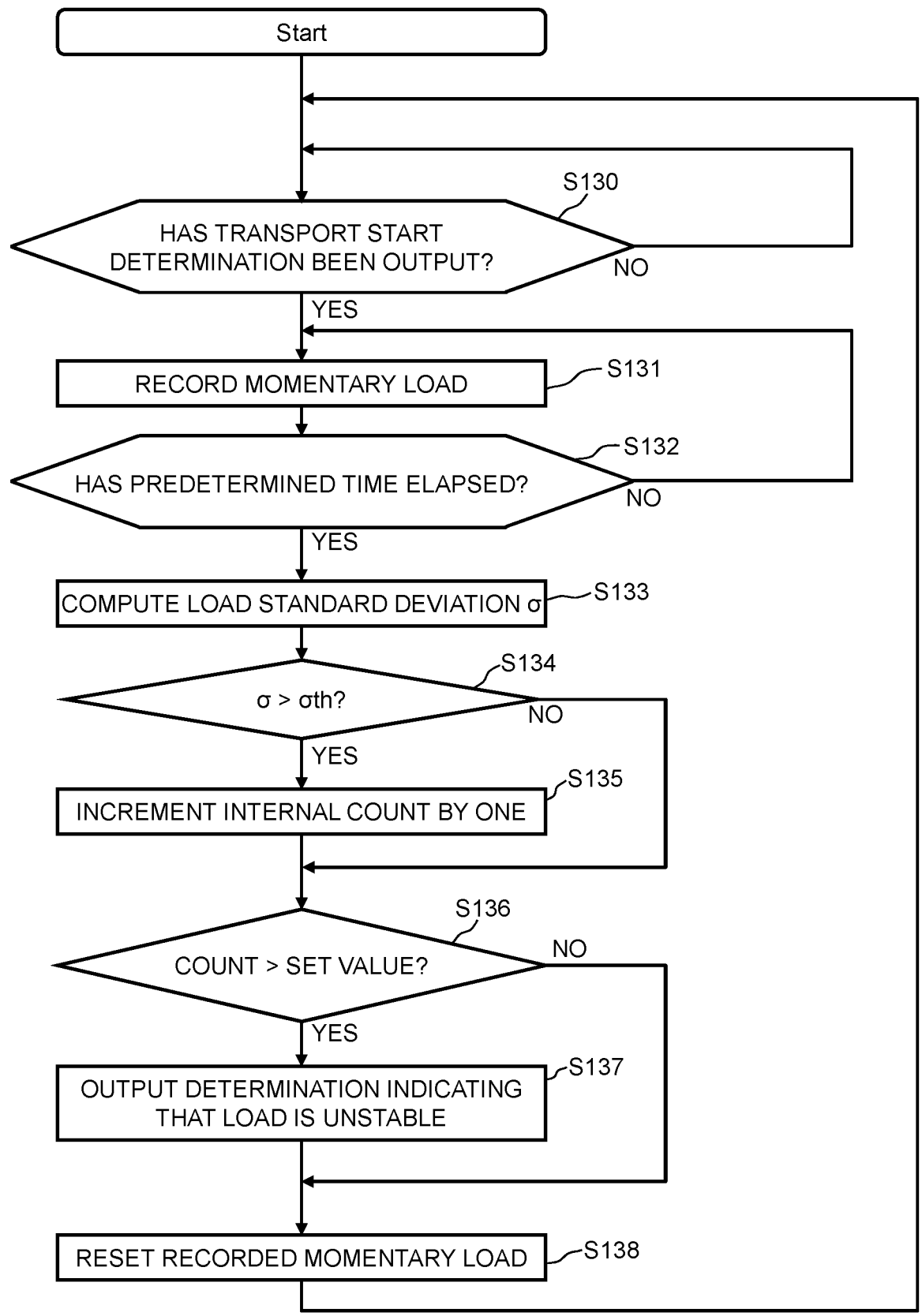
FIG. 18 is a flowchart of a load stability determination process executed by a load stability determination section in Embodiment 4.

FIG. 18 is a flowchart of a load stability determination process executed by the load stability determination section 60 in the present embodiment. The flowchart of FIG. 18 is executed per sampling period preset in the controller 21.

First, in Step S130, the load stability determination section 60 monitors whether the transport start determination has been output from the transport start determination section 54. In a case of determining herein that the transport start determination has been output, the load stability determination section 60 goes to Step S131; otherwise, the load stability determination section 60 continues to monitor the transport start determination section 54.

The load stability determination section 60 starts recording the momentary loads Ml computed by the load computing section 52 (Step S111 of FIG. 8) in Step S131, and determines whether the predetermined time in Step S113 (refer to FIG. 8) has elapsed in Step S132 for definitively determining the load in Step S132. In a case of determining that the predetermined time has elapsed, the load stability determination section 60 goes to Step S133; otherwise, the load stability determination section 60 returns to Step S131 and continues to record the momentary loads Ml. A plurality of momentary loads Ml computed by the load computing section 52 during the predetermined time are thereby recorded.

The load stability determination section 60 computes a standard deviation σ of the momentary loads Ml during a load measurement time period (predetermined time in Step S113) from a history of the momentary loads Ml recorded in Step S131 as an aspect of the time change of the momentary load Ml of the work target material during the load measurement time period in Step S133, and goes to Step S134.

The load stability determination section 60 determines whether the standard deviation σ computed in Step S133 is larger than a preset threshold σth in Step S134. In a case of determining that the standard deviation σ is larger than the threshold σth, the load stability determination section 60 determines that the variation in momentary loads Ml is large and that the recorded loads during the time period in Step S131 are unstable, increments an internal count by one in Step S135, and goes to Step S136. On the other hand, in a case of determining that the standard deviation σ is smaller than the threshold σth, the load stability determination section 60 goes to Step S136 without incrementing the internal count.

The load stability determination section 60 determines in Step S136 whether the internal count value is larger than a set value held in advance, and goes to Step S138 in a case of determining that the internal count value is smaller than the set value. Conversely, in a case of determining that the internal count value is larger than the set value, the load stability determination section 60 considers that the load has frequently become unstable during the transporting operation, outputs in Step S137 a load stability determination result indicating that the load is unstable to velocity limiting value computing section 55, and goes to Step S138.

The load stability determination section 60 resets in Step S138 the momentary loads Ml recorded in Step S131 and returns to Step S130.

Figure 19:
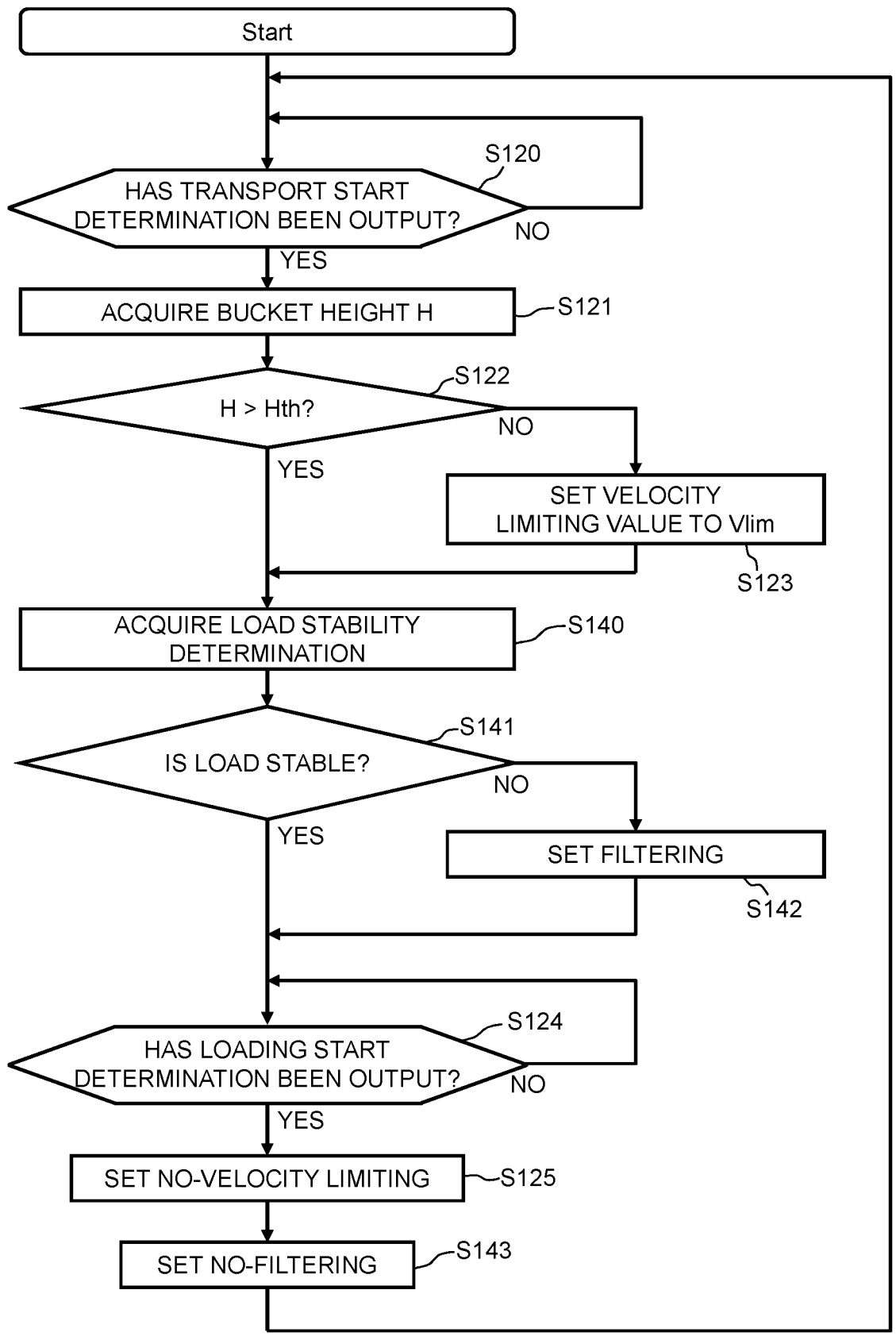
FIG. 19 is a flowchart of a process executed by the velocity limiting value computing section in Embodiment 4.

FIG. 19 is a flowchart of a process executed by the velocity limiting value computing section 55 in the present embodiment. The flowchart of FIG. 19 is executed per sampling period preset in the controller 21. The flowchart of FIG. 19 is similar to the flowchart of FIG. 11 except that an instruction of a filter process to the filter processing section 56 based on a determination of the load stability is added (Steps S140, s141, S142, and S143).

The velocity limiting value computing section 55 acquires in Step S140 the load stability determination result output from the load stability determination section 60 after Step S122 or S123, and goes to Step S141.

In Step S141, the velocity limiting value computing section 55 determines whether the load is stable. In a case in which the load stability determination result indicating that the load is unstable has not been output from the load stability determination section 60 and the velocity limiting value computing section 55 determines that the load is stable, the velocity limiting value computing section 55 goes to Step S124 without instructing the filter processing section 56 to execute a low-pass filter process. On the other hand, in a case in which the load stability determination result indicating that the load is unstable has been output from the load stability determination section 60, the velocity limiting value computing section 55 instructs in Step S142 the filter processing section 56 to execute a low-pass filter process to the velocity command input from the operation lever 22 and goes to Step S124.

In Step S124, the velocity limiting value computing section 55 monitors whether the loading start determination (refer to Step S104 of FIG. 5) has been output from the transport start determination section 54. The velocity limiting value computing section 55 goes to Step S125 herein if the loading start determination has been output. Otherwise, the velocity limiting value computing section 55 returns to before Step S124 and monitors the output from the transport start determination section 54.

The velocity limiting value computing section 55 resets in Step S125 the setting of the velocity limiting and goes to Step S143. The velocity limiting value computing section 55 instructs in Step S143 the filter processing section 56 to halt execution of the filter process and returns to Step S120.

Figure 20:
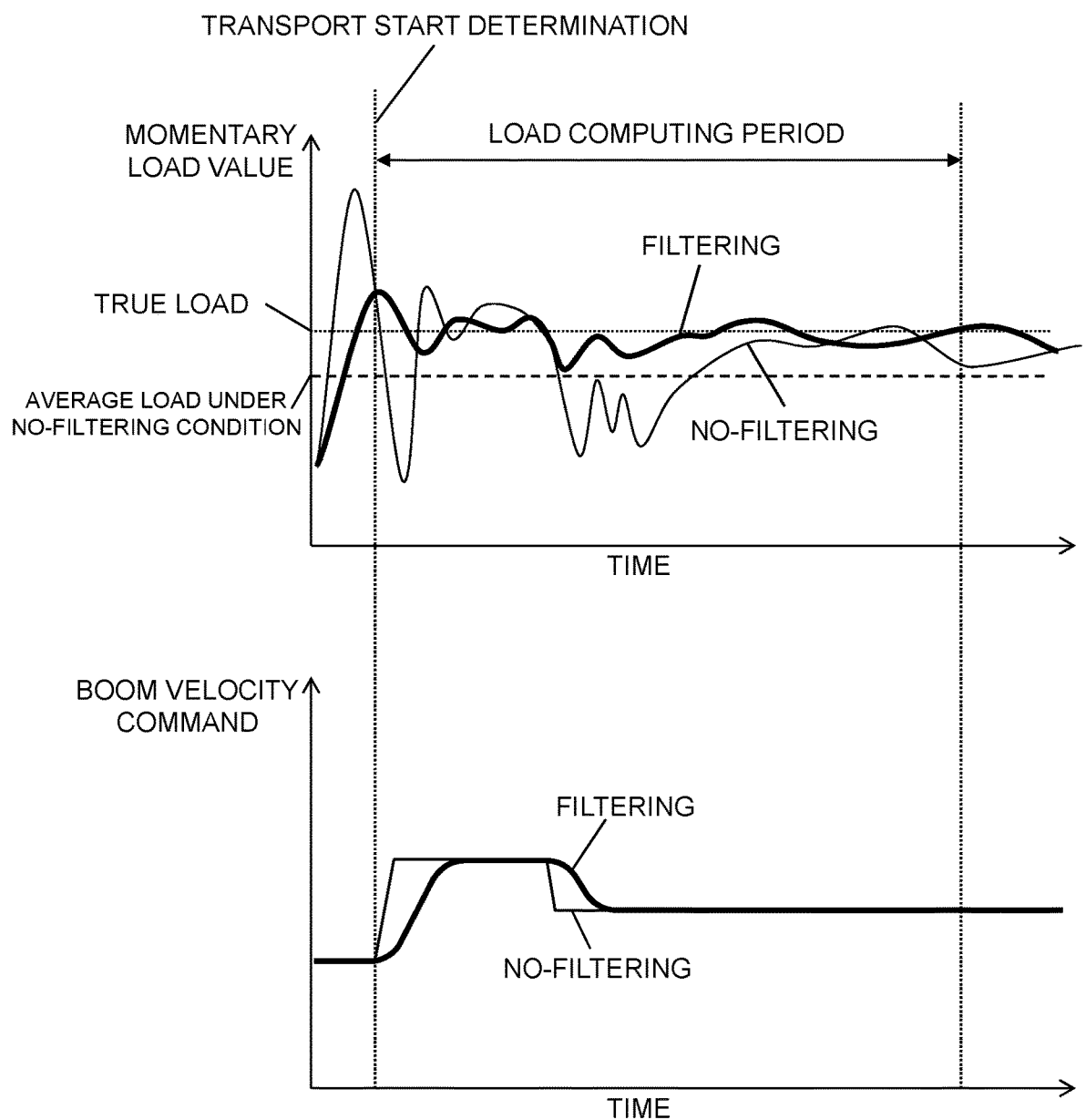
FIG. 20 is charts depicting time changes of the momentary load Ml and a boom velocity command in a case in which a filter processing section has performed a low-pass filter process and those in a case in which the filter processing section has not performed the low-pass filter process in Embodiment 4.

FIG. 20 is charts depicting the time changes of the momentary load Ml (upper diagram of FIG. 20) and a boom velocity command (velocity command to the boom cylinder 16) (lower diagram of FIG. 20) in a case in which the filter processing section 56 has performed the low-pass filter process and those in a case in which the filter processing section 56 has not performed the low-pass filter process in the present embodiment. "Filtering" is added to graphs in the case of performing the filter process, and "no-filtering" is added to graphs in the case of not performing the filter process.

In a case in which the operation amount of a boom raising operation suddenly changes upon input of the boom raising operation by the operator at the time of starting the transporting operation as depicted in a "no-filtering"-added graph in the lower diagram of FIG. 20, then the momentary load Ml often becomes vibrationally unstable due to the influence of the inertial force of the front work implement 12 or the characteristics of the hydraulic circuit as indicated by a "no-filtering"-added curve in FIG. 20, and the average value of the momentary loads Ml often deviates from a true load value.

To solve this problem, in the present embodiment, in the case in which it is determined that the load is unstable, the filter processing section 56 sets a low-pass filter to the boom velocity command, thereby suppressing sudden change in the boom velocity command and reducing a fluctuation of the momentary load Ml.

Determining whether past load computing is stable in this way makes it possible to determine whether the operator's operation at the time of the transporting operation is appropriate, to subject the boom velocity command to the filter process in the case in which the operation is not appropriate to make the boom velocity command closer to the true value; thus, it is possible to improve the accuracy of load measurement even if the operator's operation is inappropriate.

Embodiment 5

Embodiment 5 of the present invention will next be described. The present embodiment is characterized in that the controller 21 is configured such that the operator can arbitrarily set the values of the velocity limiting value Vlim and the set value Hth in Embodiment 1 via the input device (monitor 23). In the present embodiment, the monitor 23 having the touch panel functions as the input device to which the set values Vlim and Hth are input. The other parts are the same as those in Embodiment 1.

Figure 21:
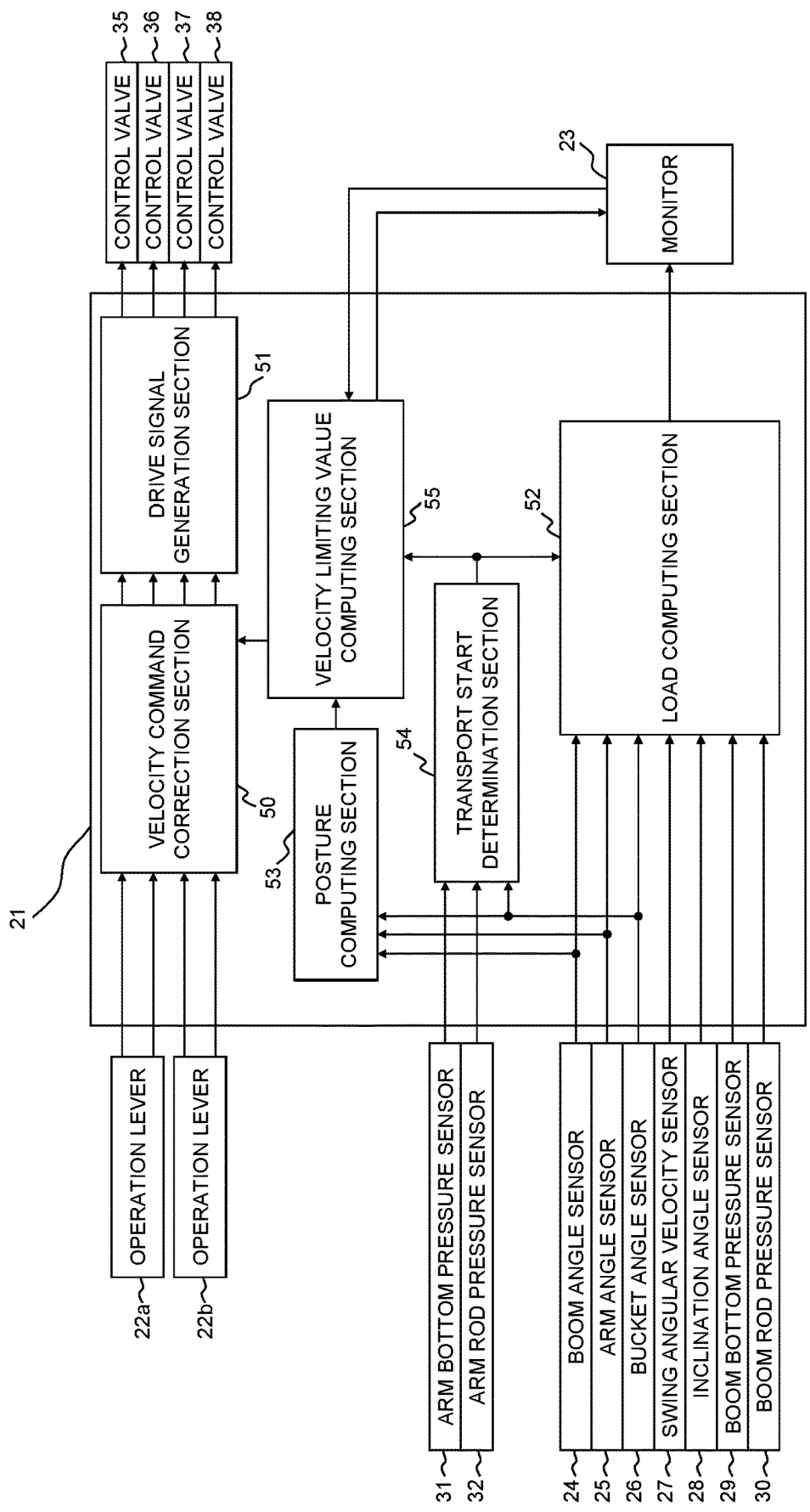
FIG. 21 is a system configuration diagram of a load measurement system in Embodiment 5.

FIG. 21 is a system configuration diagram of a load measurement system in the present embodiment. The controller 21 in the present embodiment is configured to be capable of receiving signals (a signal for changing the velocity limiting value (Vlim) and a signal for changing the vertical distance set value (Hth)) output from the monitor 23. The signals from the monitor 23 are input to the velocity limiting value computing section 55, and the velocity limiting value computing section 55 changes the velocity limiting value Vlim and the set value Hth on the basis of the signals.

Figure 22:
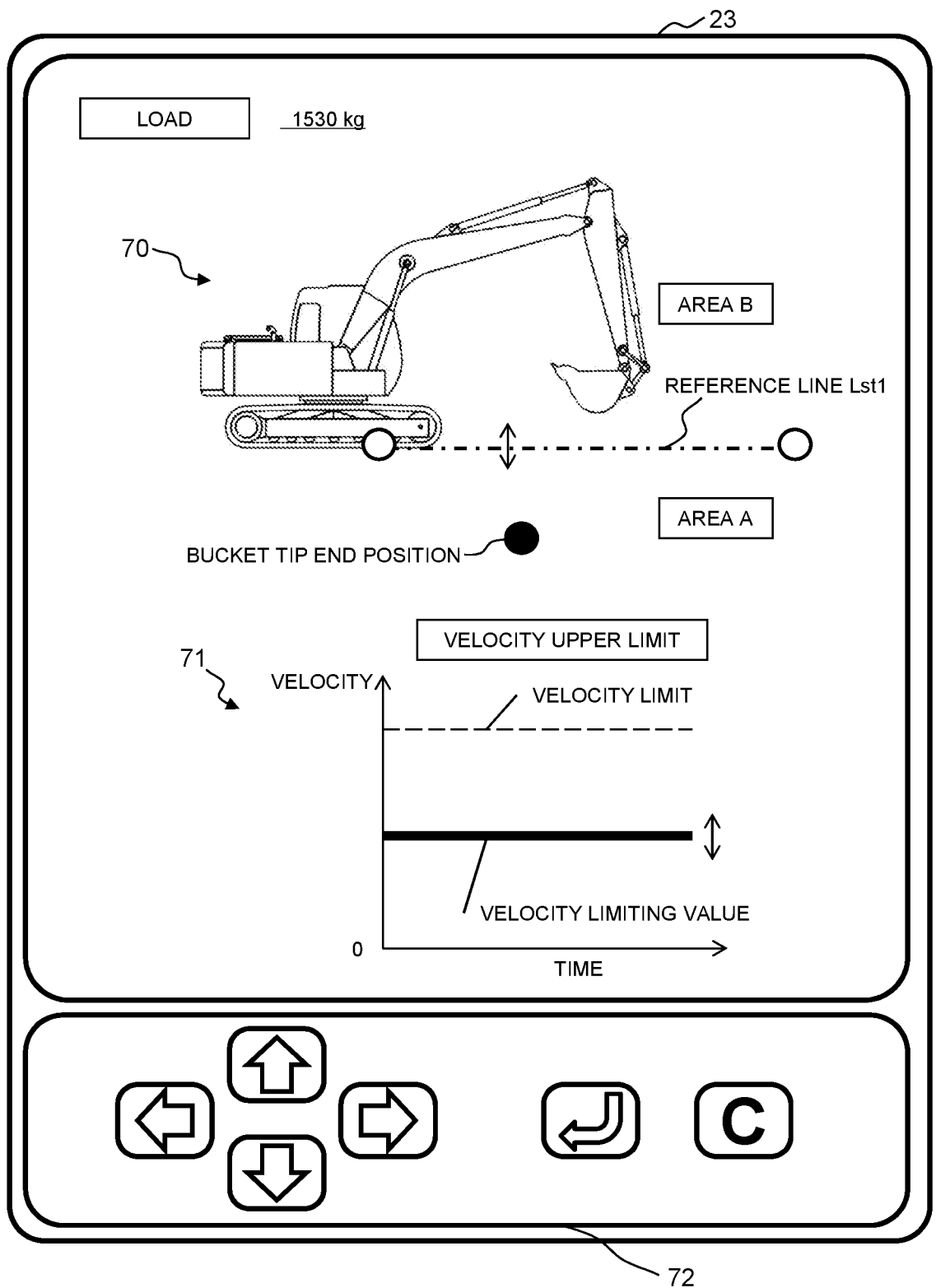
FIG. 22 is a schematic diagram of an example of a display screen of a monitor in Embodiment 5.

FIG. 22 is a schematic diagram of an example of a display screen of the monitor 23 in the present embodiment. As depicted in FIG. 22, on the screen of the monitor 23, a load value display section 73 in which the load value of the work target material computed by the load computing section 52 is displayed, a posture display section 70 in which the posture of the front work implement 12 is mainly displayed, a velocity limiting value display section 71 in which the time change of the actual boom rotational velocity and the velocity limiting value Vlim are displayed, and an input section 72 for the operator to set a desired velocity limiting value Vlim and a desired set value Hth are provided.

In the posture display section 70, the areas A and B and the reference line Lst1 depicted in FIG. 10 are displayed, and the tip end position of the bucket 15 at the time of starting the transporting operation is indicated by a black circle. The position of the reference line Lst1 can be adjusted by touching once any of two white circles present on two ends of the reference line Lst1 in the screen, and then appropriately operating an up or down arrow in the input section 72, thereby vertically moving the position of the reference line Lst1. A numeric value of the set value Hth may be displayed near the reference line Lst1. The height of the reference line Lst1 set by the input section 72 is input, as a vertical distance set value change signal, to the velocity limiting value computing section 55, and the velocity limiting value computing section 55 changes the set value Hth on the basis of the change signal.

The value of the velocity limiting value Vlim can be adjusted by touching once a straight line indicating the velocity limiting value Vlim within the velocity limiting value display section 71 and then appropriately operating the up or down arrow in the input section 72, thereby vertically moving the straight line. A numeric value for adjustment may be displayed near the line indicating the velocity limiting value Vlim. The value of the velocity limiting value Vlim set by the input section 72 is input, as a velocity limiting value change signal, to the velocity limiting value computing section 55, and the velocity limiting value computing section 55 changes the velocity limiting value Vlim on the basis of the change signal.

Configuring the controller 21 to be capable of simultaneously displaying the bucket tip end position at the time of starting the transporting operation and the reference line Lst1, simultaneously displaying the time change of the actual boom rotational velocity and the velocity limiting value Vlim, and yet changing the reference line Lst1 and the velocity limiting value Vlim to the operator's desired positions or values in this way makes it possible to impose the velocity limiting adapted to the work environment or the operator; thus, it is possible to improve the accuracy of load measurement.

While a case of changing the velocity limiting value Vlim and the set value Hth in Embodiment 1 to the desired values has been described for the sake of convenience, it goes without saying that the controller 21 may be configured such that various set values set in preceding and subsequent other embodiments can be changed on the monitor (input device) 23.

Embodiment 6

Embodiment 6 of the present invention will next be described. The present embodiment corresponds to a modification of Embodiment 1, and is characterized in that the controller 21 is configured with the posture computing section 53 that computes a horizontal distance L from the upper swing structure 11 to the bucket claw tip at the time of starting the transporting operation, and the velocity limiting value computing section 55 that computes the velocity limiting value Vlim in a case in which the horizontal distance L is smaller than a set value Lth. The other parts are the same as those in Embodiment 1.

Figure 24:
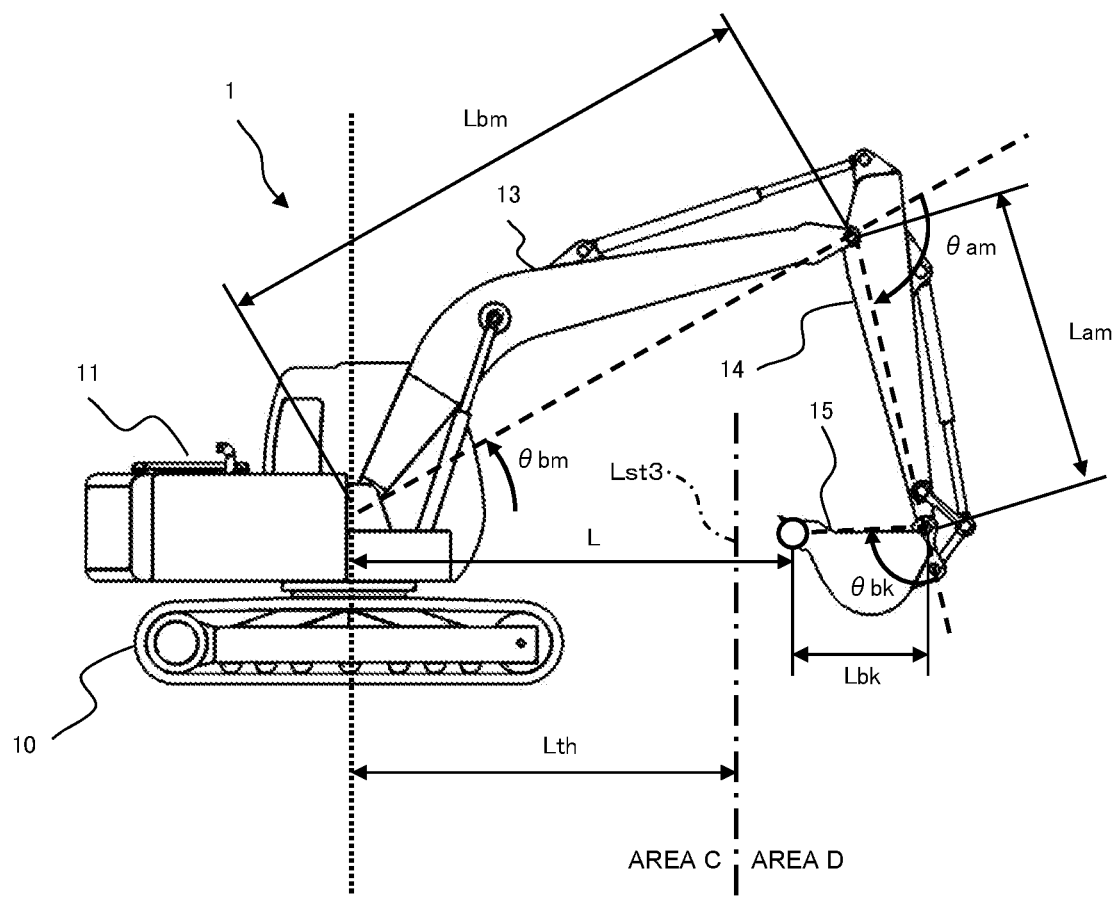
FIG. 24 is an explanatory diagram of a method of computing the velocity limiting value Vlim of the boom cylinder by the velocity limiting value computing section in the controller in Embodiment 6.

In the present embodiment, it is assumed that the tip end position of the bucket 15 in the horizontal direction is a reference of the posture of the front work implement 12 as depicted in FIG. 24, and the posture computing section 53 continuously computes the horizontal distance L from a swing center of the upper swing structure 11 to the tip end position of the bucket 15 in a predetermined period. The horizontal distance L is computed by the following Equation (11).

$$L = Lbm \cdot \cos(\theta bm) + Lam \cdot \cos(\theta bm + \theta am) + Lbk \cdot \cos(\theta bm + \theta am + \theta bm) \quad (11)$$

In the present embodiment, a reference line Lst3 in parallel to a swing axis of the upper swing structure 11 is set, in advance, at a predetermined position closer to a vehicle body front than the swing center of the upper swing structure 11 in advance, and setting is made such that velocity limiting is imposed in an area C closer to the upper swing structure 11 than the reference line Lst3 and velocity limiting is not imposed in an area D farther from the upper swing structure 11. A distance from the rotation center of the boom 13 to the reference line Lst3 (horizontal distance) is a set value Lth. In the present embodiment, whether the velocity limiting value of the boom cylinder 16 is imposed is classified depending on whether the bucket tip end position crosses the reference line Lst3 (that is, whether the bucket claw tip is present in the area C or D) at the time of starting the transporting operation.

A flowchart executed by the velocity limiting value computing section 55 in the present embodiment is substantially the same as that of FIG. 11 except that Steps S121 and S122 of FIG. 11 are changed as follows. In other words, the velocity limiting value computing section 55 acquires the horizontal distance L from the posture computing section 53 in Step S121 and the velocity limiting value computing section 55 determines whether the horizontal distance L is larger than the set value Lth in the subsequent step, Step S122. Since the other processes are the same as those of FIG. 11, description will be omitted. Needless to say, the velocity limiting value Vlim set in Step S123 may differ from that of FIG. 11.

Figure 25:
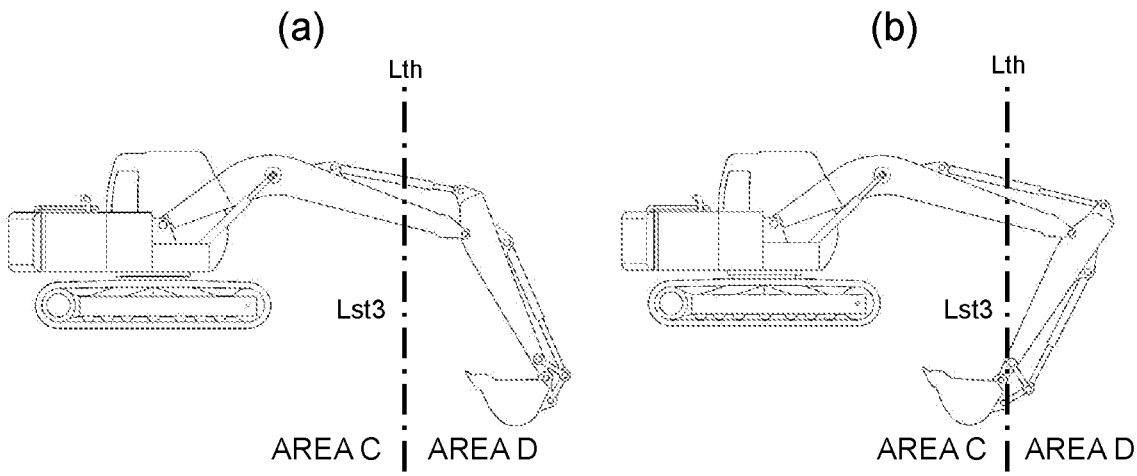
FIG. 25 are explanatory diagrams of a boom cylinder velocity control process by the controller in Embodiment 6.
Figure 25:
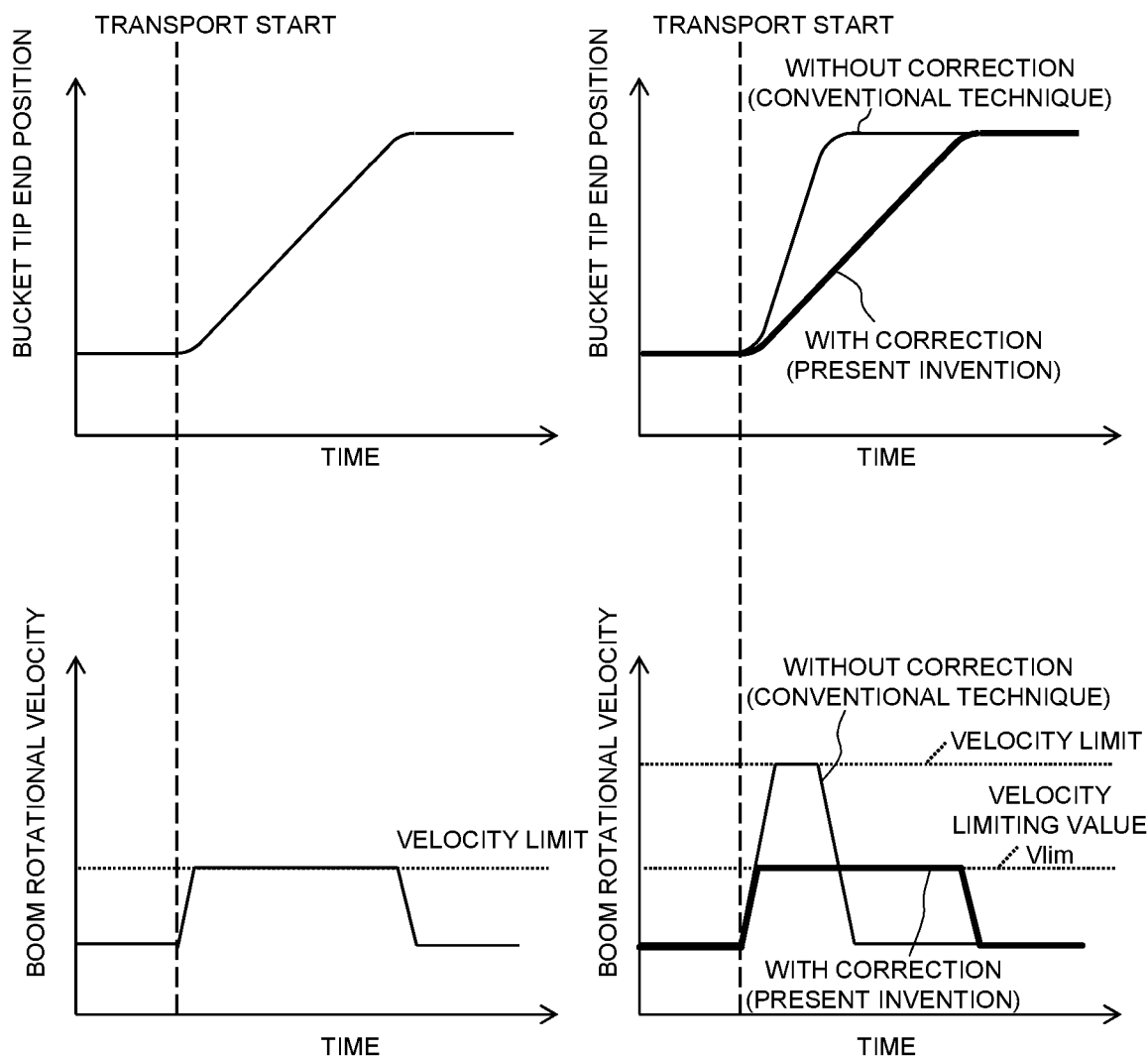

FIG. 25 depict graphs (middle diagram) of time changes of the height of the bucket tip end position during the transporting operation and graphs (lower diagram) of time changes of the boom rotational velocity during the transporting operation in two postures (a) and (b) depicted in the upper diagram. In other words, FIG. 25 are similar to FIG. 12 in Embodiment 1. As depicted in the graphs indicated by "without correction" of FIG. 25(b), in the case in which the tip end position L of the bucket claw tip is smaller than the set value Lth (that is, the bucket claw tip is present in the area C closer to the upper swing structure 11 than the reference line Lst3) at the time of starting the transporting operation, then the torque generated by the front work implement 12 using the gravitational force decreases and the boom rotational velocity increases. Owing to this, it is impossible to sufficiently ensure the time period during which the boom rotational velocity is constant (equal to the velocity limit value) and the number of times of sampling of the momentary load Ml decreases; thus an error tends to occur to the load value. By contrast, according to the present embodiment, as depicted in FIG. 25(b), the velocity limiting Vlim provided on the rotational velocity of the boom 13 makes it possible to secure time until the bucket tip end position reaches a predetermined height and to ensure the time period during which the boom rotational velocity is constant. It is, therefore, possible to make the momentary load Ml stable and improve the accuracy of load measurement similarly to Embodiment 1.

It is clear that velocity limiting may be imposed while four areas are set by a combination of the areas A and B in Embodiment 1 and the areas C and D in the present embodiment. Furthermore, the controller 21 may be configured to determine the set value by setting a map of correction amounts with a plurality of bucket tip end positions as representative points and carrying out interpolation to a measured bucket tip end position using the map.

Moreover, in the present embodiment, similarly to Embodiment 5, the controller 21 may be configured to be capable of setting the set value Lth and the velocity limiting value Vlim to desired values using the monitor 23 that is the input device. Furthermore, it goes without saying that in the present embodiment, similarly to Embodiment 2, the velocity limiting value Vlim may be set to decrease in proportion to a reduction in the horizontal distance L.

Embodiment 7

Figure 26:
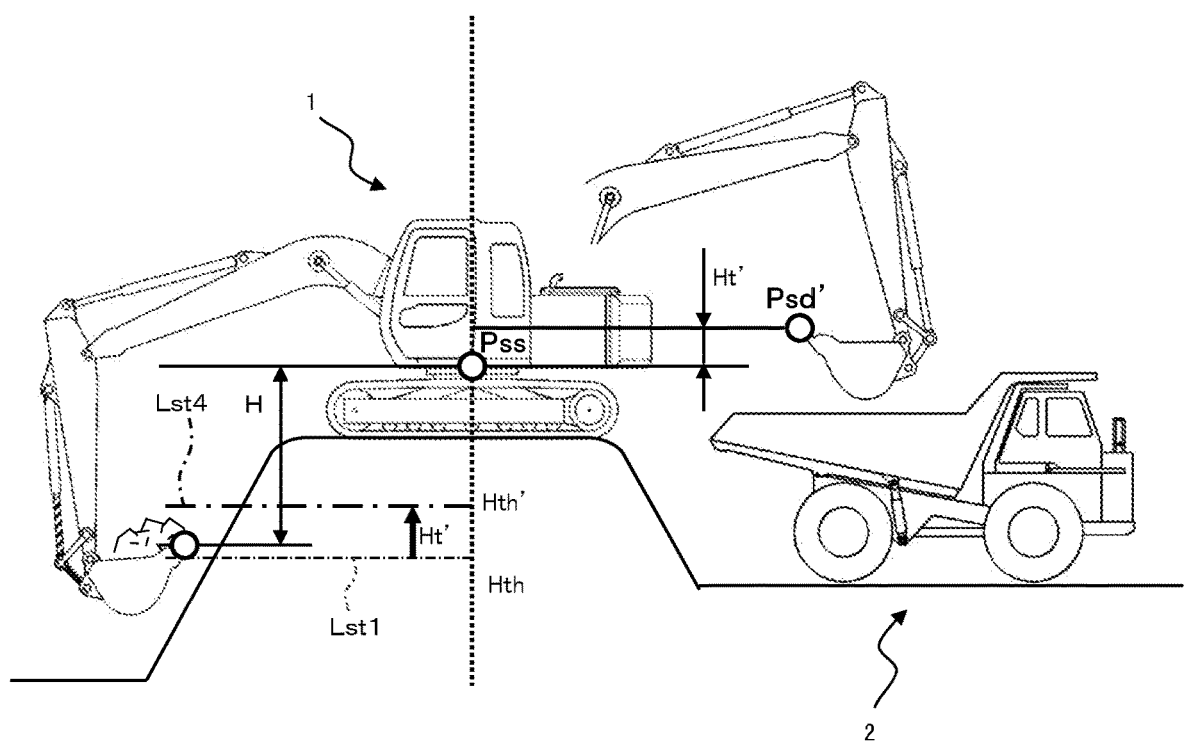
FIG. 26 is a schematic diagram depicting a method of computing the relative distance between the hydraulic excavator and the dump truck according to Embodiment 7.

Embodiment 7 of the present invention will next be described. The present embodiment corresponds to a modification of Embodiment 3. In Embodiment 3, the relative distance Ht between the reference point Pss of the hydraulic excavator 1 and the reference point Psd of the dump truck 2 in the vertical direction is calculated from the signal transmitted from the ranging satellite 7. The relative distance computing section 61 in the present embodiment, by contrast, assumes a height position Psd' of the bucket claw tip at the time of starting the loading operation onto the cargo stand of the dump truck 2 as a relative distance Ht' between the hydraulic excavator 1 and the dump truck 2 in the vertical direction, as depicted in FIG. 26. The height position (relative distance) Ht' of the bucket claw tip at the time of starting the loading operation can be acquired from the computing result of the posture computing section 53 when the transport start determination section 54 outputs the loading start determination in Step S104 of FIG. 5.

The controller 21 in the present embodiment sets a new set value Hth' for the vertical distance to classify the posture of the front work implement 12 at the time of starting the transporting operation by the following Equation (12) using the calculated relative distance Ht'. In other words, the velocity limiting value computing section 55 in the present embodiment determines whether to set the velocity limiting value Vlim to the boom cylinder velocity with reference to a new reference line Lst4 obtained by moving upward the reference line Lst1 which is present at the height Hth by the relative distance Ht'. In an example of FIG. 26, the reference point of the dump truck 2 is located above the reference point of the hydraulic excavator; thus, Hth' is obtained by subtracting Ht from Hth in the following Equation (12).

$$Hth' = Hth - Ht' \quad (12)$$

Even by computing the relative distance Ht' in this way, it is possible to obtain advantages similar to those of Embodiment 3. It is noted that in calculating the relative distance, a laser range finder or an acoustic range finder, for example, may be provided and the position of the transporting machine 2 may be directly measured in addition to the constituent elements described in the present embodiment and Embodiment 3.

<Others>

It is noted that the present invention is not limited to the above embodiments and encompasses various modifications without departing from the spirit of the invention. For example, the present invention is not limited to the work machine provided with all the configurations described in the above embodiments and encompasses a work machine from which a part of the configurations is deleted. Furthermore, a part of the configurations according to a certain embodiment can be added to or can replace the configurations according to the other embodiment.

For example, the front work implement 12 of the hydraulic excavator 1 having the upper swing structure 11 used in the description of the embodiments has the boom 13, the arm 14, and the bucket 15. However, the configuration of the front work implement is not limited to this configuration, and the present invention is also applicable to a work machine having a front work implement of a different form, that is, for example, a lifting magnet machine.

Figure 23:
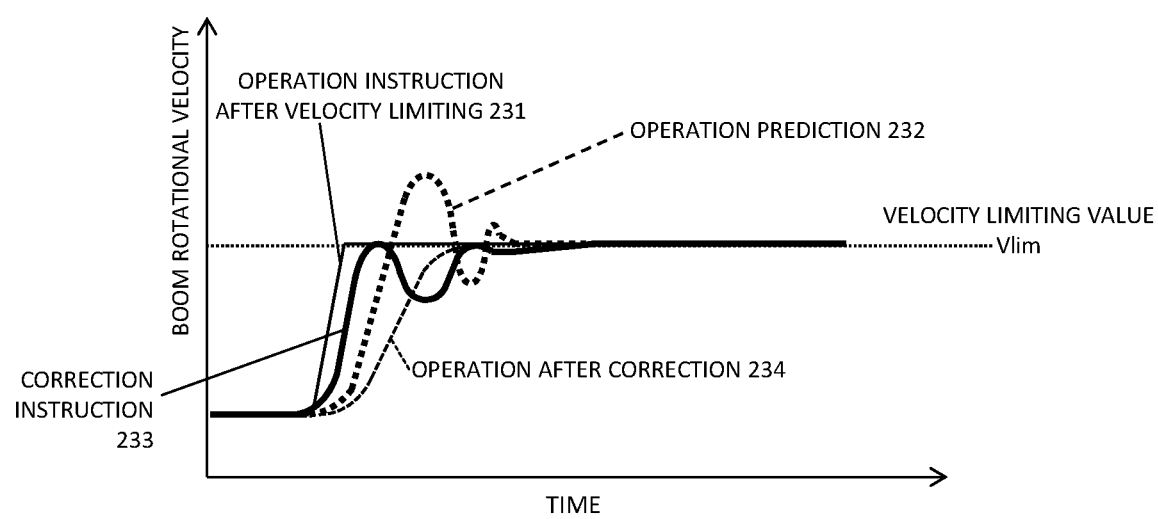
FIG. 23 is an explanatory diagram of an example of correction of a velocity command based on operation prediction.

It is also clear that the methods of correcting the velocity command are not limited to those based on the velocity limiting and the low-pass filter. For example, there is a concern that the influence of inertia of the front work implement 12 prevents an operation instruction (velocity command) 231 to the boom 13 from matching an actual operation (velocity) of the boom 13 in the hydraulic excavator 1 as depicted in FIG. 23, and that an actual boom velocity vibrationally behaves beyond the velocity limiting value Vlim. To solve such a problem, the controller 21 is provided with a prediction model of a motion of the hydraulic excavator 1, and the velocity command correction section 50 computes an operation prediction 232 of the boom 13 in a case of applying the correction of the velocity command based on the velocity limiting value Vlim depicted in FIG. 12. In addition, in a case in which the operation prediction 232 of the boom 13 by the velocity command correction section 50 exceeds the velocity limiting value Vlim, the velocity command correction section 50 generates a correction instruction 233 to prevent the operation prediction 232 from exceeding the velocity limiting Vlim by carrying out back calculation from the characteristics of the prediction model. The correction instruction 233 in this case is a signal that may cancel a vibration of the prediction model as depicted in FIG. 23. Generating such a correction instruction 233 to multiply the operation instruction 231 by the correction instruction 233 enables the boom 13 to rotate substantially at a constant velocity like an operation after correction 234.

While the velocity limiting based on the posture of the front work implement 12 at the time of the transporting operation is imposed on the single actuator (boom cylinder 16) for the sake of simplicity in each embodiment, it is clear that similar velocity limiting can be individually imposed on other actuators (for example, the arm cylinder 17, the bucket cylinder 18, or the like).

Moreover, the transport start determination by the transport start determination section 54 is not limited to the method using the arm cylinder bottom pressure and the bucket angle as described above. In a case of a work machine, that is, for example, a lifting magnet machine, start and end of the transporting operation are easy to determine on the basis of ON/OFF signals related to magnet absorption.

It is clear that computing of the load is not limited to a model depicted in FIG. 7 and may be performed using different computing equations. For example, the load may be computed using an equation of motion of the front work implement 12 configured by the boom 13, the arm 14, and the bucket 15.

The method of definitively determining the load is not limited to a scheme depicted in FIG. 8. For example, a time period during which a rotational acceleration of the boom 13 is equal to or lower than a predetermined value may be extracted and the load may be definitively determined by averaging loads during the time period.

The setting of the velocity limiting value Vlim is not limited to the methods depicted in FIGS. 10, 12, 13, and 14.

DESCRIPTION OF REFERENCE CHARACTERS

1: Hydraulic excavator
2: Dump truck
12: Front work implement
13: Boom
14: Arm
15: Bucket
16: Boom cylinder
17: Arm cylinder
18: Bucket cylinder
21: Controller
22: Operation lever (operation device)
23: Monitor (display device, input device)
24: Boom angle sensor
25: Arm angle sensor
26: Bucket angle sensor
27: Swing angular velocity sensor
28: Inclination angle sensor
29: Boom bottom pressure sensor
30: Boom rod pressure sensor
31: Arm bottom pressure sensor
32: Arm rod pressure sensor
51: Drive signal generation section
52: Load computing section
53: Posture computing section
54: Transport start determination section
55: Velocity limiting value computing section
56: Filter processing section
61: Relative distance computing section

The invention claimed is:

1. A work machine comprising:
a multijoint work implement;
an actuator configured to drive the work implement;
an operation device configured to generate a velocity command to the actuator in response to an operation amount; and
a controller having a load computing section configured to compute a load of a work target material on the basis of thrust information about the actuator during the period when the work implement is transporting the work target material to above a transporting machine, wherein
the controller further includes:
a velocity limiting value computing section configured to compute a limiting value of a velocity of the actuator on the basis of posture information about the work implement at a time of starting transport of the work target material to above the transporting machine by the work implement;
a velocity command correction section configured to correct the velocity command in such a manner that the velocity of the actuator is equal to the limiting value when the velocity of the actuator specified by the velocity command exceeds the limiting value and output the corrected velocity command, and configured to output the velocity command without correction when the velocity of the actuator specified by the velocity command is equal to or lower than the limiting value; and a drive signal generation section configured to generate and output a drive signal for the actuator on the basis of the velocity command output from the velocity command correction section.

2. The work machine according to claim 1, further comprising
a posture computing section configured to compute a height of a tip end of the work implement relative to the work machine at the time of starting transporting the work target material to above the transporting machine by the work implement, as the posture information about the work implement, wherein
the velocity limiting value computing section computes the limiting value in a case in which the height of the tip end of the work implement exceeds a reference line Lst1 set below the work implement.

3. The work machine according to claim 2, wherein
the limiting value is set in such a manner as to decrease in proportion to an increase in a distance between the height of the tip end of the work implement and the reference line Lst1.

4. The work machine according to claim 1, further comprising
a posture computing section configured to compute a horizontal distance from the work machine to the tip end of the work implement at the time of starting transporting the work target material to above the transporting machine by the work implement, as the posture information about the work implement, wherein
the velocity limiting value computing section computes the limiting value in a case in which the horizontal distance is smaller than a predetermined value.

5. The work machine according to claim 4, wherein
the limiting value is set in such a manner as to decrease in proportion to a decrease in the horizontal distance.

6. The work machine according to claim 1, wherein
the controller further includes a relative distance computing section configured to measure a relative distance between the work machine and the transporting machine in a vertical direction; and the work machine further includes a posture computing section configured to compute a height of a tip end of the work implement relative to the work machine at the time of starting transporting the work target material to above the transporting machine by the work implement, as the posture information about the work implement, wherein
the velocity limiting value computing section calculates a moving height of the work implement from the relative distance in the vertical direction and the height of the tip end of the work implement, and computes the limiting value in a case in which the moving height exceeds a reference line Lst1 set below the work machine.

7. The work machine according to claim 1, wherein
the controller further includes:
a load stability determination section configured to determine whether the load value of the work target material is stable on the basis of a time change of the load value of the work target material computed by the load computing section; and
a filter processing section configured to perform a low-pass filter process on a velocity command generated by the operation device in a case in which the load stability determination section determines that the load value of the work target material is not stable, wherein
the velocity command correction section corrects a filter velocity command that is the velocity command having been subjected to the low-pass filter process by the filter processing section in such a manner that an actuator velocity specified by the filter velocity command is equal to the limiting value and outputs the corrected filter velocity command when the actuator velocity exceeds the limiting value, and outputs the filter velocity command without correcting the filter velocity command when the actuator velocity specified by the filter velocity command is equal to or lower than the limiting value.

* * * * *